United States Patent
Hanlon et al.

(10) Patent No.: US 12,077,836 B2
(45) Date of Patent: Sep. 3, 2024

(54) PORTABLE DEHYDRIDING APPARATUS AND METHOD OF USING SAME

(71) Applicant: ATOMIC ENERGY OF CANADA LIMITED/ÉNERGIE ATOMIQUE DU CANADA LIMITÉE, Chalk River (CA)

(72) Inventors: Sean Hanlon, Petawawa (CA); Kevin Mccaugherty, Pembroke (CA); Scott Read, Petawawa (CA); Daniel S. F. Cheung, Deep River (CA)

(73) Assignee: ATOMIC ENERGY OF CANADA LIMITED/ÉNERGIE ATOMIQUE DU CANADA LIMITÉE

( * ) Notice: Subject to any disclaimer, the term of this patent is extended or adjusted under 35 U.S.C. 154(b) by 472 days.

(21) Appl. No.: 17/612,784

(22) PCT Filed: May 22, 2020

(86) PCT No.: PCT/CA2020/050695
§ 371 (c)(1),
(2) Date: Nov. 19, 2021

(87) PCT Pub. No.: WO2020/232559
PCT Pub. Date: Nov. 26, 2020

(65) Prior Publication Data
US 2022/0251678 A1    Aug. 11, 2022

Related U.S. Application Data

(60) Provisional application No. 62/851,600, filed on May 22, 2019, provisional application No. 62/851,607, filed on May 22, 2019.

(51) Int. Cl.
*C22B 9/14* (2006.01)
*B01J 20/02* (2006.01)
(Continued)

(52) U.S. Cl.
CPC ............ *C22B 9/14* (2013.01); *B01J 20/0207* (2013.01); *B01J 20/28033* (2013.01);
(Continued)

(58) Field of Classification Search
None
See application file for complete search history.

(56) References Cited

U.S. PATENT DOCUMENTS 3,896,042 A    7/1975   Anderson et al.
6,241,477 B1 *  6/2001   Brezoczky ............ C23C 14/564
                                                    417/51
(Continued)

FOREIGN PATENT DOCUMENTS

CA    3007703 A1    12/2019
DE    1903009 A1     9/1970
GB    1248184 A      9/1971

OTHER PUBLICATIONS

Spalthoff, W. et al., "The use of Hydrogen Getters for Prevention of Hydrogen Embrittlement in Zirconium-Alloy Fuel Cans", Astm STP458, E.F. Baroch, Ed., American Society for Testing and Materials, Philadelphia, PA, 1969, 338-344.
(Continued)

*Primary Examiner* — George Wyszomierski
(74) *Attorney, Agent, or Firm* — Joseph C. Zucchero; Carolyn S. Elmore; Elmore Patent Law Group, P.C.

(57) ABSTRACT

A method of removing hydrogen interstitially dissolved within an object can include: positioning a sorption pad having a contact surface and comprising a sorptive material; urging the contact surface into metallurgical contact with the first target surface while at a treatment temperature that is greater than about 200 degrees Celsius; c) maintaining the metallurgical contact for a treatment period during which the hydrogen migrates from the target object to the sorptive material; and at the conclusion of the treatment period,
(Continued)

separating the contact surface from the first target surface and moving the sorption pad and any hydrogen sequestered therein away from the object.

20 Claims, 7 Drawing Sheets

(51) Int. Cl.
    *B01J 20/28*     (2006.01)
    *B01J 20/34*     (2006.01)
    *C01B 3/00*     (2006.01)
    *G21C 17/017*     (2006.01)

(52) U.S. Cl.
    CPC ....... *B01J 20/3433* (2013.01); *B01J 20/3483* (2013.01); *C01B 3/0026* (2013.01); *G21C 17/017* (2013.01)

(56) References Cited

U.S. PATENT DOCUMENTS

| | | | |
|---|---|---|---|
| 8,815,115 B2 | 8/2014 | Coda et al. | |
| 2009/0148635 A1* | 6/2009 | Coda | C01B 3/508 |
| | | | 428/34.1 |
| 2010/0205956 A1* | 8/2010 | Clucas | H02K 9/10 |
| | | | 60/524 |
| 2013/0025585 A1* | 1/2013 | Conte | F24S 40/40 |
| | | | 126/651 |
| 2017/0287578 A1 | 10/2017 | Brachet et al. | |
| 2020/0208248 A1* | 7/2020 | McRae | C22C 9/00 |

OTHER PUBLICATIONS

Zielinski, A. et al., "Hydrogen-enhanced degradation and oxide effects in zirconium alloys for nuclear applications", International Journal of Hydrogen Energy, 36(14), doi:10.1016/j.ijhydene.2011.04.002, May 12, 2011, 8619-8629.

"International Preliminary Report on Patentability", International application No. PCT/CA2020/050695, Nov. 16, 2021, 1-7.

Bertsch, J., "Hydrogen: A Trojan Horse in Fuel-Rod Cladding Tubes", Paul Scherrer Institut, Jul. 14, 2014, 1-3.

Manning, M., "Localization of a Robotic Crawler for CANDU Fuel Channel Inspection", Thesis, University of Ontario Institute of Technology, 1-187, Jun. 2017.

Ryan, M., "Keeping Spent Nuclear Fuel Safe", EPRI Journal, 1-5, Mar./Apr. 2016.

Strachan, B., et al., "Operating Performance and Reliability of CANDU PHWR Fuel Channels in Canada", Presentation, IAEA Symposium Reliability of Pressure Components, Stuttgart, Germany, Mar. 21-25, 1983, 1-24.

Trelinski, M., "Inspection of CANDU Reactor Pressure Tubes Using Ultrasonics", 17th World Conference on Nondestructive Testing, Oct. 25-28, 2008, Shanghai, China, 1-8.

\* cited by examiner

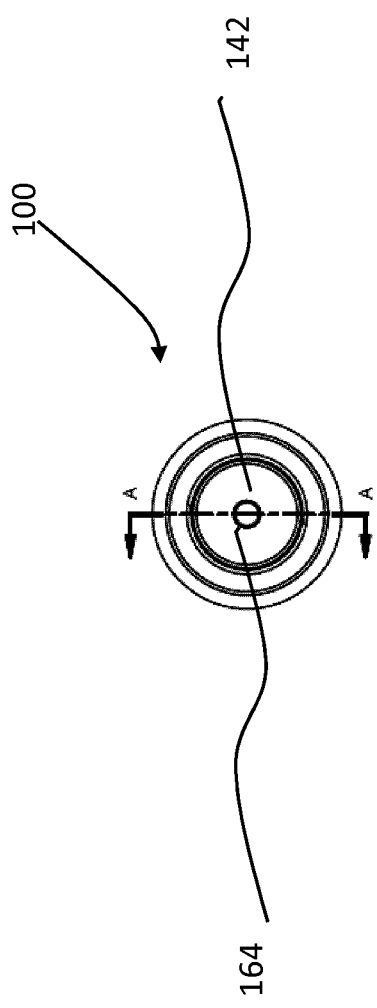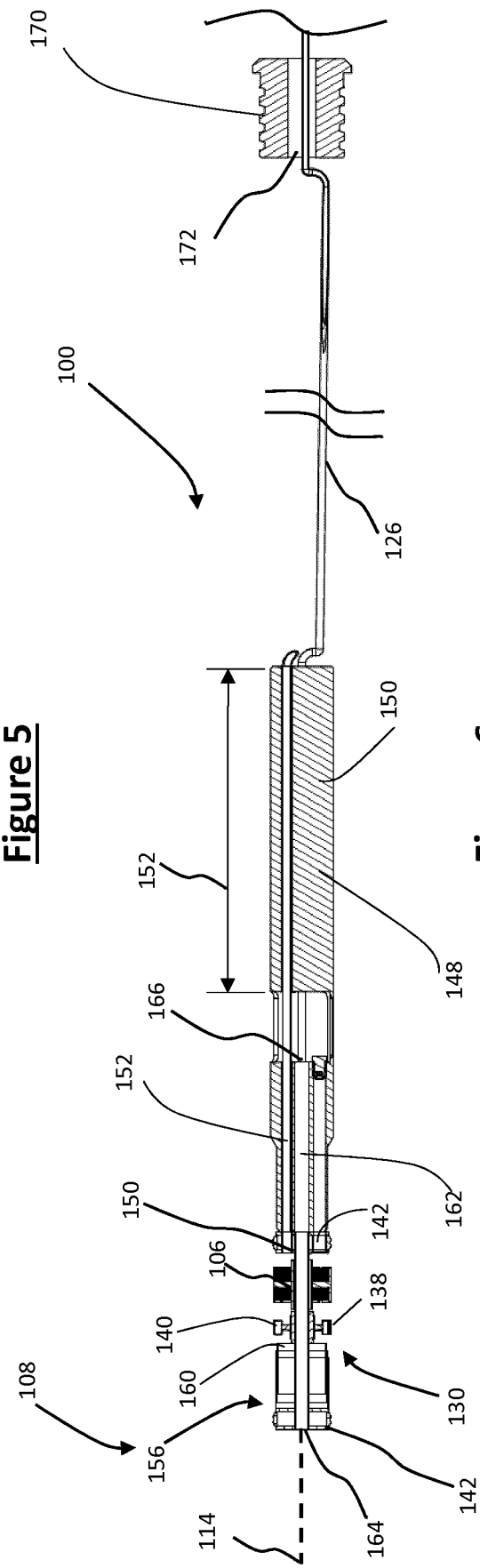

PORTABLE DEHYDRIDING APPARATUS AND METHOD OF USING SAME

CROSS REFERENCE TO RELATED APPLICATIONS

The present application claims priority to and the benefit of U.S. provisional application No. 62/851,600 filed May 22, 2019 and entitled Dehydriding Method and U.S. provisional application No. 62/851,607 filed May 22, 2019 and entitled Portable Dehydriding Apparatus and Method of Using Same, the entirety of these applications being incorporated herein by reference.

FIELD OF THE INVENTION

In one of its aspects, the present disclosure relates generally to the sorption of hydrogen (which can include hydrogen and/or isotopes of hydrogen), and more particularly to a method and apparatus for the removal of the hydrogen material from a metallic target object.

INTRODUCTION

German Patent no. DE1903009 discloses permanently incorporating a hydrogen receptor in macroscopic form (such as a winding, coating or embedded structure), metallurgically affixed to the zirconium or zirconium alloy component. The hydrogen receptor comprises yttrium, an yttrium alloy, or a rare earth metal or alloy thereof that will preferentially incorporate or "getter" the hydrogen in situ during operation in an ongoing fashion.

SUMMARY

In accordance with one broad aspect of the teachings described herein, a method of removing hydrogen interstitially dissolved within an object comprising a zirconium alloy and having a first target surface may include the steps of:
 a) positioning a sorption pad having a contact surface and comprising a sorptive material that has a hydrogen-getting capacity so that the contact surface is adjacent the first target surface, the contact surface being configured to be complementary to a shape of the first target surface;
 b) urging the contact surface into metallurgical contact with the first target surface using a clamping apparatus while an interface between the first target surface and the contact surface is at a treatment temperature that is greater than about 200 degrees Celsius;
 c) maintaining the metallurgical contact between the first target surface and the contact surface while the interface is at the treatment temperature for a treatment period, during which the hydrogen migrates from the target object to the sorptive material; and
 d) at the conclusion of the treatment period, separating the contact surface from the first target surface and moving the sorption pad and any hydrogen sequestered therein away from the object.

Optionally, prior to step b) the first target surface may be at an initial temperature and the method may include the step of heating at least one of the sorption pad and the target object using a heating apparatus to raise the temperature of the interface between the first target surface and the contact surface from the initial temperature to the treatment temperature.

In step b) the contact surface may be in direct, metallurgical contact with the target surface.

The method may include the step of pre-treating the target surface prior to step b) to remove at least one of oxides and oxide-forming compounds from the target surface thereby exposing the zirconium alloy to enhance the mechanical contact between the contact surface and the target surface.

The pre-treating may include mechanically scraping the target surface with a scraper shortly prior to step (b).

The method may include providing a modified atmosphere having less than 20 kPa partial pressure of oxygen around the interface between the target surface and the contact surface during at least a portion of the treatment period.

Providing the modified atmosphere may include introducing an inert cover gas around the interface between the target surface and the contact surface, and wherein the cover gas is removed at the conclusion of the treatment period.

The method may include after completing step (d), heating the sorptive material to a regeneration temperature for a regeneration time, whereby hydrogen that was absorbed within the sorptive material during the treatment period migrates out of the sorptive material, thereby reducing an amount of hydrogen sequestered within the sorptive material.

When prior to step a) a region of the object that is bounded by the target surface and extends into the object includes more than about 80 ppm hydrogen, the method may be conducted so that the region of the object comprises less than about 20 ppm hydrogen at the conclusion of step c).

The method may include, in parallel with steps a)-d) and/or after step d),
 e) positioning a second sorption pad having a second contact surface and comprising the sorptive material so that the second contact surface is adjacent a second target surface that is spaced apart from the target surface;
 f) urging the second contact surface into metallurgical contact with the second target surface while an interface between the second target surface and the second contact surface is at the treatment temperature;
 g) maintaining the metallurgical contact between the second target surface and the second contact surface while the interface is at the treatment temperature for a second treatment period; and
 h) at the conclusion of the second treatment period, separating the second contact surface from the second target surface and moving the sorption pad and any hydrogen sequestered therein away from the second target surface.

The sorptive material may have a greater thermodynamic affinity for hydrogen than the zirconium alloy in the object.

The sorptive material may include yttrium, and may include at least 70% wt yttrium.

In step b) the contact surface may be in direct, metallurgical contact with the target surface.

The contact surface may include the sorptive material.

The contact surface may include a selective transmission layer that covers the sorptive material and is disposed between the sorptive material and the target surface during the treatment period. The selective transmission layer may be configured to permit the migration of hydrogen therethrough and to inhibit the migration of oxygen, whereby oxidation of the sorptive material is inhibited.

The treatment temperature may be greater than 200 and may preferably be greater than 250 degrees Celsius, between 250 and about 300 degrees Celsius, and may more preferably be greater than 300 degrees Celsius and between about 300 and about 350 degrees Celsius. The treatment temperature is preferably not more than 550 degrees Celsius in the examples described herein.

The treatment period may be less than 30 days, and may preferably be less than 5 days and may be less than about 48 hours.

The object being treated may include a pressure tube installed within a pressure tube type nuclear reactor. The pressure tube may extend along a tube axis between a first end connected to a first end fitting that is a different material than the pressure tube via a first joint and an opposed second end. The target surface may be an inner surface of the pressure tube proximate the first end fitting and step a) may include inserting the sorption pad within an interior of the pressure tube while the pressure tube is in situ within the nuclear reactor.

Step a) may include passing the sorption pad through an interior of the first end fitting to reach the interior of the pressure tube, and step b) may include pressing the contact surface radially against the target surface.

Steps a)-d) may be completed while the nuclear reactor is offline.

Steps a)-d) may be completed while the nuclear reactor is online.

Prior to step a), the method may include draining a coolant liquid from the interior of the pressure tube to expose the first target surface.

In accordance with another broad aspect of the teachings described herein, a portable apparatus for removing hydrogen interstitially dissolved within an object comprising a zirconium alloy and having a first target surface during a treatment period may include a sorption pad having a contact surface and comprising a sorptive material that has a hydrogen-getting capacity. The contact surface may be positionable opposite the target surface and may be configured to be complementary to a shape of the first target surface. A clamping apparatus may be operable to selectably move the sorption pad between i) a retracted position and in which the contact surface is spaced apart from the target surface and the apparatus is movable relative to the object and ii) a deployed position in which the contact surface is urged into metallurgical contact with the first target surface and movement of the apparatus relative to the object is inhibited. A controller may be configured to control the clamping apparatus.

When a first treatment period is initiated the contact surface may be moved to and maintained in the deployed position whereby hydrogen migrates from the target object to the sorptive material during the treatment period, and when the first treatment period is complete the contact surface may be moved to the retracted position.

A heater may be configured to heat an interface between the contact surface and the target surface to a treatment temperature that is greater than about 200 degrees Celsius during the treatment period.

The heater may be configured to heat at least one of the sorption pad and the target surface.

The treatment temperature may be greater than 250 degrees Celsius.

The treatment temperature may be greater than 350 degrees Celsius.

The sorptive material may include yttrium.

The sorptive material may include at least 70% wt yttrium.

The contact surface may include the sorptive material.

The contact surface may include a selective transmission layer that covers the sorptive material and is configured so that the selective transmission layer is disposed between the sorptive material and the target surface when the sorption pad is in the deployed position. The selective transmission layer may be formed from a different material than the sorption pad and may be configured to permit the migration of hydrogen therethrough and to inhibit the migration of oxygen, whereby oxidation of the sorptive material during the treatment period is inhibited.

A sealing apparatus may be adjacent the sorption pad and may be configurable in i) a transport configuration in which the sealing apparatus is positionable proximate the target surface and ii) a deployed configuration in which the sealing apparatus seals with the object to fluidly isolate a treatment region containing the target surface and contact surface from the ambient environment. The sealing apparatus may be maintainable in the deployed configuration during the treatment period and may be returnable to the transport configuration at the conclusion of the treatment period.

A gas supply system may be configured to introduce a non-oxidizing cover gas into the treatment region so that the treatment region has less than 20 kPa oxygen partial pressure at least during the treatment period.

The cover gas may include at least one of helium, nitrogen and argon.

The sealing apparatus may include at least a first extendible sealing gasket. When the sealing apparatus is in the transport configuration the sealing gasket is deflated and when the sealing apparatus is in the deployed configuration the sealing gasket is extended and bears against the object to at least partially seal the treatment region.

A surface treating member may be configured to engage the target surface prior to the treatment period to remove at least one of oxides and oxide-forming compounds from the target surface before the contact surface is moved to the deployed position.

The surface treating member may be configured to mechanically engage the target surface.

The surface treating member may be connected to and be movable with the sorption pad so that when the sorption pad is translated into a position proximate the target surface the surface treating member passes over and treats the target surface before the sorption pad is registered with the target surface.

In accordance with another broad aspect of the teachings described herein, a portable apparatus for removing hydrogen that is interstitially dissolved within a pressure tube (containing a zirconium alloy) for a pressure tube type nuclear reactor during a treatment period can include an internal engagement portion that is insertable within an interior of the pressure tube and that has a hub extending along a hub axis. The hub axis may be aligned with an axial direction of the pressure tube when the hub is within the pressure tube. At least a first sorption pad may be supported by the hub and may have a first contact surface and may include a sorptive material that has a hydrogen-getting capacity. The first contact surface ay be positionable opposite a first target surface on the interior of the pressure tube and may have a curved shape that is complementary to a curvature of the first target surface. A clamping apparatus may be operable to selectably move the sorption pad between i) a retracted position in which the contact surface is spaced apart from the target surface and the internal engagement portion is movable relative to the pressure tube to move the first contact surface into registration with the first target surface and ii) a deployed position in which the contact surface is urged radially outwardly and into metallurgical contact with the target surface. When a first treatment period is initiated the first contact surface can be moved to and maintained in the deployed position whereby hydrogen migrates from the target object to the sorptive material during the treatment period. When the first treatment period is complete the contact surface may be moved to the retracted position and the internal engagement portion is removable from the interior of the pressure tube.

An external portion may be positionable outside the pressure tube and may include a controller that is communicably linked to the internal engagement portion and configured to control the clamping apparatus.

The internal engagement portion may include a heater that is configured to heat an interface between the target surface and the first contact surface to a treatment temperature that is greater than about 200 degrees Celsius for a treatment period whereby hydrogen migrates from the pressure tube to the sorptive material.

The heater may include a plurality of resistive heating coils in contact with the first sorption pad and the external portion may include a power supply connected to the plurality of resistive heating coils.

An umbilical conduit may extend between the external portion and the internal engagement portion. The umbilical conduit may contain at least one of a hydraulic fluid conduit, a pneumatic fluid conduit and an electrical cable.

The external portion may include a temporary channel closure plug that is configured to temporarily seal an end of the pressure tube during the treatment period. The umbilical conduit may pass through the temporary channel closure plug.

A temporary reactor shield plug may be removably positionable within the interior of the pressure tube between the hub and the temporary channel closure plug to block radiation from escaping the pressure tube while the apparatus is in use.

The umbilical conduit may pass through temporary reactor shield plug.

The internal engagement portion may include a sealing apparatus that is configurable in i) a transport configuration in which the internal engagement portion is movable relative to the pressure tube to position the first contact surface proximate the first the target surface, and ii) a deployed configuration in which the sealing apparatus seals with pressure tube to fluidly isolate a treatment region containing the first target surface and the first contact surface from the ambient environment. The sealing apparatus may be maintainable in the deployed configuration during the treatment period and is returnable to the transport configuration at the conclusion of the treatment period.

A gas supply system may be configured to introduce a non-oxidizing cover gas into the treatment region so that the treatment region has less than 20 kPa oxygen partial pressure during the treatment period.

The cover gas may include at least one of helium, nitrogen and argon.

The sealing apparatus may include a first sealing disc and a second sealing disc that are axially spaced apart from each other and disposed on opposite sides of the hub. Each sealing disc may include a disc-like body portion and an inflatable/extendable sealing gasket extending around a perimeter of the body portion. When the sealing apparatus is in the deployed configuration each sealing gasket may be extended and bear against the pressure tube to help seal the treatment region, and when the sealing apparatus is in the transport configuration each sealing gasket may be deflated and spaced apart from the pressure tube.

A coolant bypass conduit may extend axially through the hub between first and second conduit ends that are disposed on opposite sides of the treatment region. The coolant bypass conduit may be operable to convey a reactor coolant liquid from one side of the treatment region to another side of the treatment region without exposing an interior of the treatment region to the reactor coolant liquid.

The internal engagement portion may include a surface treating member that is insertable within the pressure tube and may be configured to engage the first target surface prior to the treatment period to remove at least one of oxides and oxide-forming compounds from the first target surface before the first contact surface is moved to the deployed position.

The surface treating member may be configured to mechanically engage the target surface to physically remove the at least one of oxides and oxide-forming compounds.

The surface treating member may be mounted on the hub and may be movable with the first sorption pad so that when the first sorption pad is translated within the pressure tube into a position proximate the first target surface the surface treating member passes over and treats the first target surface before the first sorption pad is registered with the first target surface.

The surface treating apparatus may include at least a first scraper unit rotatably mounted to the hub having a first scraper that is configured to scrape against the inner surface of the pressure tube to remove the oxide layer from the target surface.

The first scraper unit further may include a first debris container positioned adjacent the first scraper and configured to receive and retain debris removed from the target surface by the first scraper.

The internal engagement portion further may include a protective sheath having a fixed portion and a retractable portion that can translate in the axial direction between an extended position in which it encloses the first sorption pad and a retracted position in with the first sorption pad is exposed.

The clamping apparatus may include at least a first hydraulic actuator extending generally radially between the hub and the first sorption pad and being fluidly connected to a hydraulic power apparatus that provides a hydraulic liquid.

The first hydraulic actuator ay be insertable within the pressure tube and the hydraulic power apparatus may be disposed outside the pressure tube.

The hydraulic liquid may include heavy water.

Other advantages of the teachings described may become apparent to those of skill in the art upon reviewing the present specification.

BRIEF DESCRIPTION OF THE FIGURES

FIG. 5 is an end view of the apparatus of FIG. 3;

FIG. 6 is a cross-sectional view of the apparatus of FIG. 3, taken along line A-A;

DETAILED DESCRIPTION

Figure 1:
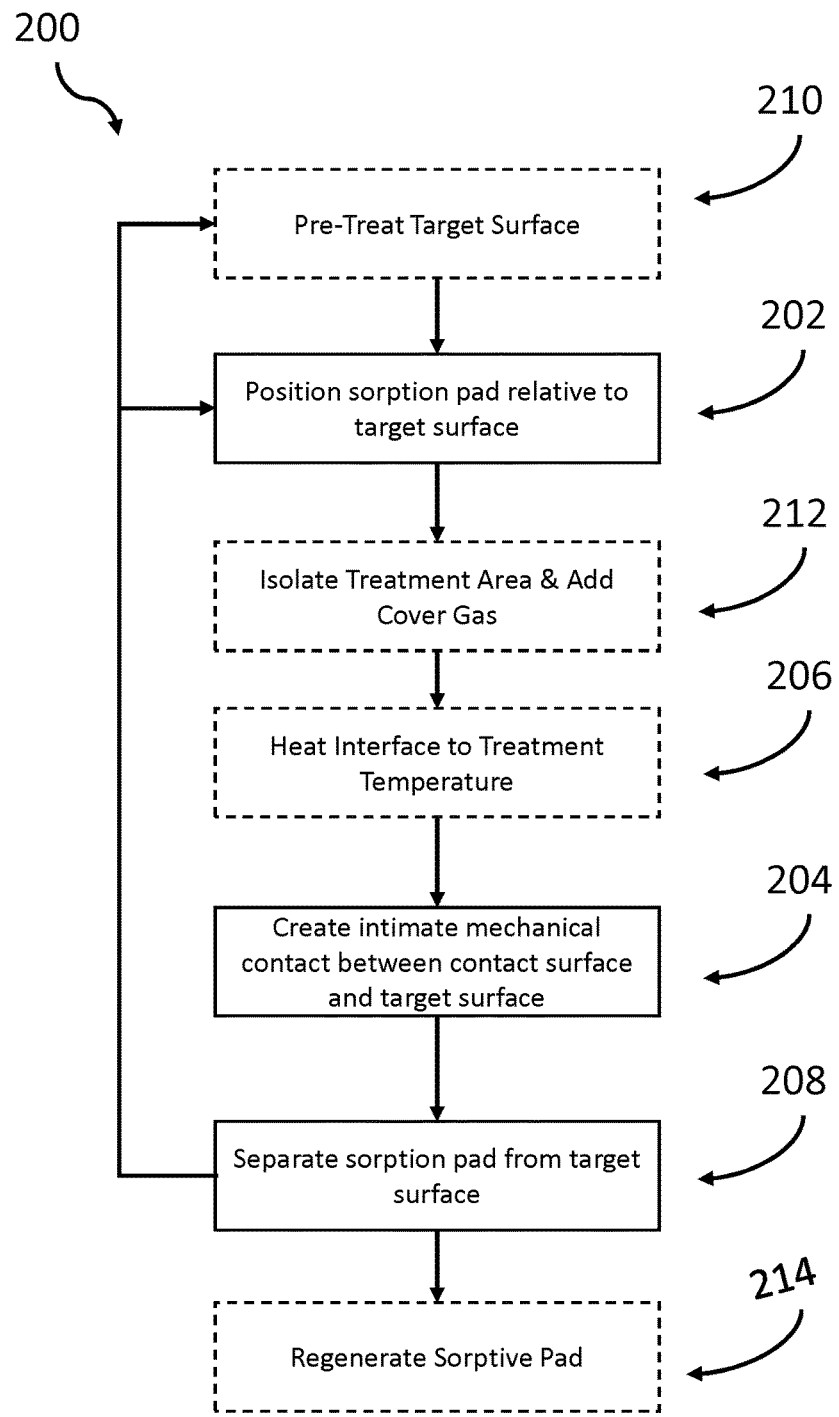
FIG. 1 is a flow chart showing one example of a dehydriding method.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors, or owners do not intend to abandon, disclaim, or dedicate to the public any such invention by its disclosure in this document.

Hydrogen and its isotopes, such as deuterium, can accumulate within certain metal components. Such accumulation can include interstitially dissolved hydrogen and hydrogen that has formed relatively brittle metal-hydrides. This accumulation can be undesirable under some conditions and in some applications, as this accumulation can have an adverse effect on the mechanical or physical properties to the components and/or systems containing properties of these components. In the present description hydrogen and its isotopes can be collectively referred to as hydrogen material for the purposes of the methods and apparatuses described herein. In some instances the term hydrogen may be used for simplicity and is understood to also refer to the isotopes of hydrogen unless stated otherwise.

Hydrogen can accumulate in a metal component due to numerous factors, including environmental service conditions, corrosion mechanisms, gradients in chemical potential, diffusion phenomena, etc. Under some conditions, brittle metal-hydrides may form, which can affect the mechanical properties of the component and/or systems containing of these components. Changes in mechanical properties (or any other desired characteristic) may limit the service life of a component.

For example, hydrogen accumulation in a Canadian Deuterium Uranium ("CANDU") reactor pressure tube, particularly near the rolled joint regions (inlet and outlet), can pose a threat to the structural integrity of the pressure tube, and can limit the service life of the fuel channel. Specifically, it has been reported that when hydrides are present in a CANDU reactor pressure tube, the fracture toughness of the pressure tube is reduced and there is increased susceptibility to delayed hydride cracking (for example, see C. E. Coleman, J. F. R. Ambler, "Delayed Hydride Cracking in Zr-2.5 wt % Nb alloy", Reviews on Coatings and Corrosion, Vol. III, (1979), 105-157). As a result, reactor pressure tubes may need to be replaced and/or reactor operating restrictions can be applied.

As another example, the cladding of spent nuclear fuel may also accumulate hydrogen. Over time hydrides may form. The presence of hydrides in the fuel cladding may cause the fuel cladding to become brittle, thus posing a risk that the structural integrity of the cladding may become comprised.

It may therefore be beneficial to remove hydrogen accumulations from metal components in a non-destructive manner, preferably in such a way as to help restore desirable material characteristics and mechanical properties of the components.

One existing method of removing hydrogen accumulations from metal components is to heat the metal component under vacuum to liberate the trapped hydrogen. However, vacuum extraction of hydrogen from metals typically requires high temperatures and that the component be subjected to a vacuum, neither of which may be possible or practical in some service applications.

Another existing method of limiting and/or removing hydrogen accumulations from metal components is to permanently affix a hydrogen absorbing material or a "hydrogen getter" to the components and/or within the system, such as at the time of manufacture. For example, yttrium may be incorporated into a metal component to act as a hydrogen getter. However, permanently incorporating or affixing a hydrogen getter, such as yttrium, to a component may not be acceptable in some service applications. This may be particularly true in the nuclear industry.

For example, a hydrogen getter material/component may impart undesirable mechanical or physical properties to the system that it is incorporated or affixed to. That is, the getter component may expand as increasing amounts of hydrogen are gettered, which may impact the integrity or function of the component. Furthermore, yttrium and some other common hydrogen getter materials have a relatively higher neutron capture cross-section than typical zirconium alloys used within the reactor. The ongoing presence of such getter materials while the reactor is in use may impact nuclear reactor efficiency when such getter materials are incorporated into zirconium alloy-containing pressure tubes due to an increased absorption of neutrons needed for the fission process by the getter material, as compared to zirconium alloys. Therefore, it may not be desirable to permanently incorporate a hydrogen getter into metal components in some service applications.

Despite the advances made to-date in the removal of hydrogen accumulation in metal components, there is room for improvement to address the above-mentioned problems and shortcomings of the prior art. It may therefore be beneficial to develop a new method to remove accumulated hydrogen from metal components in a non-destructive manner, preferably in such a way as to restore desirable material characteristics and mechanical properties of the components and/or mitigate the deleterious effects of hydrogen and hence extend the life of the component.

It may also be desirable to be able to perform such hydrogen removal from an object in situ, in a transient and/or time limited manner (e.g. without requiring the inclusion of a permanent hydrogen getter that would remain in place after the treatment method is complete). That is, the transient treatment methods described herein can preferably be carried out using a suitable portable treatment apparatus that be used to conduct the desired treatment method and can then be removed when the treatment is completed, preferably without leaving any of its hydrogen getter material behind at the treatment location. The same apparatus can then optionally be used to treat other objects and the object that was treated need not include a permanently affixed getter material/component.

For example, one example of the methods described herein may be used to remove hydrogen from the pressure tubes within a CANDU™ type nuclear reactor while the pressure tubes remain installed within the reactor (e.g. with requiring the transportation of the radioactive material to an off-site location). One schematic example a portion of a CANDU™ type nuclear reactor is include in FIG. 2 for reference. As shown in this example, the fuel channel assembly can include a pressure tube 400 that extends along a tube axis 418, is located within a surrounding calandria tube 402 and is supported via a plurality of spacers 412. Multiple fuel bundles 404 (not all shown) can be positioned within the pressure tube 400 while the reactor is in use, and a coolant liquid (such as heavy water in CANDU™ type nuclear reactors) can flow through the interior of the pressure tube 400 and enter/exit via feeders 408. The pressure tube 400 is, in this example, formed from a zirconium alloy. The ends of the pressure tube 400 are each connected to respective end fittings 406 which are, in this example, formed from a different material. The pressure tube 400 and fittings 406 are joined together using any suitable technique, and in the illustrated example are joined using rolled joints indicated schematically at 410. One region in which hydrogen can accumulate within the pressure tube 400 is in the portions of the pressure tube 400 that are adjacent the fittings 406 and just inboard of the rolled joints 410. The inner surface of the pressure tube 400 at this location is one example of a target surface 414 (shown at one end only for clarity, but an analogous target surface can be defined at the other end of the pressure tube 400) that can be treated using the methods and/or apparatuses described herein. Defects and other compromised regions of the pressure tube 400 may also benefit from treatment using the methods and/or apparatuses described herein.

To help treat the pressure tube 400 in situ, a suitable, portable treatment apparatus can be transported to the reactor site, used to treat one or more pressure tubes and can then be removed. But for the relatively lower hydrogen content, the treated pressure tubes would have substantially the same configuration/make-up before and after the treatment process, and could continue to be used within the reactor.

Optionally, the pressure tubes 400 may be treated while the reactor is offline, such as during a maintenance shutdown (e.g. where the reactor remains offline to perform maintenance which cannot be carried out with the reactor operating at high power). In such use cases, it may be desirable to have the hydrogen removal process occur in a relatively short treatment time, as this may help reduce the overall downtime of the reactor. The operating conditions of the method can be selected to help facilitate the increased treatment speed in such examples, such as by conducting the method at a relatively higher temperature by heating the pressure tube and/or sorption pad using a heating apparatus (e.g. a temperature that is higher than the typical operating temperature of the pressure tube while the reactor is in use) to help promote hydrogen migration and/or by selecting a preferred sorptive material. In some examples of the methods described herein, the treatment parameters in an offline treatment process may be selected so that treatment time is between 24 hours and about 30 days (e.g. about 720 hours), and preferably may be between about 12 hours and about 1 week, and may be less than about 72 hours, less than about 48 hours and may be less than 24 hours in some preferred examples. When treating the pressure tubes with the reactor offline the treatment temperature may be selected to be a relatively higher temperature to help promote hydrogen migration, these temperatures may be between about 275 and about 250 degrees, and may be between about 300 and about 310 degrees Celsius. If the treatment temperature is about 310 degrees then the treatment time may be about 24 hours. It is possible in some examples that the treatment temperature may be selected to be higher than the usual temperature of the pressure tube while the reactor is in use.

The methods and apparatuses utilize sorption pads, that contain a suitable sorptive material, that functions generally as a hydrogen getter (e.g. has a suitable a hydrogen-getting capacity). The methods and apparatus then use these sorption pads to help facilitate the migration of hydrogen from the target object into the sorption pad, where the hydrogen is sequestered/retained. When the sorption pad(s) are then removed from the object being treated the sequestered hydrogen is also removed. The sorption pads can then be post-processed in any suitable way, including by disposing of the pads or optionally regenerating the sorption pads (to liberate the hydrogen sequestered therein) such that a given sorption pad could then be used again to treat another target surface. It may also be possible for a given sorption pad to sequentially treat two or more target surfaces without being regenerated and/or reconditioned between uses. In some embodiments, the sorption efficacy of the sorption pad may be restored, at least in part, by heating the sorption pad to a regeneration temperature under vacuum. Through this process, hydrogen (and its isotopes) that has been absorbed by the sorption pad may be removed. In some embodiments, the sorption pad may be removed from the treatment apparatus for the regeneration process.

The materials that may be suitable sorptive materials, and therefore that may be used to form the suitable sorption pads, may differ based on a variety of factors, including the composition of the target object that is to be treated, the expected amount of hydrogen to be removed, the ambient operating conditions that are expected at the treatment location (temperatures, clamping pressures, environmental chemistry, etc.). For example, the metallic target objects may, in some examples, comprise an alloy containing zirconium, titanium, hafnium or niobium, or any combination thereof. The metallic target object that is to be treated using the methods describe here may preferably, in some examples, comprise zirconium or a zirconium alloy.

For example, a desirable hydrogen getter is one that be referred to as a 'perfect hydrogen sink', where the hydrogen concentration in the target object near the getter-target interface approaches zero. Under these conditions the hydrogen can migrate out of the target object and be 'gettered' relatively quickly, e.g. as fast as diffusion in the target object allows. One example of such a 'perfect sink' is where an oxide-free target is located in a vacuum with a nominal pressure of zero, where any gaseous hydrogen released from the target is instantly removed from the chamber, maintaining the perfect vacuum. However, in practice, approaching these ideal conditions is usually not practical, especially when the equilibrium hydrogen gas pressure of the target is low.

The performance of a hydrogen getter in an inert environment with a 'perfect' diffusion bond to the target can be described by two parameters: 1) The chemical potential for hydrogen (related to the equilibrium gas pressure), where a lower chemical potential (or gas pressure) is relatively better, and 2) Hydrogen diffusivity, where a higher diffusivity is better. The need for a high diffusivity decreases as the difference in chemical potential increases. These parameters need not be equally weighted.

For the purposes of the present description, the chemical potential can be considered to be relatively more important than the hydrogen diffusivity for the methods and apparatus described herein, as the difference in chemical potential between the sorptive material and the target is largely responsible for the driving force for hydrogen to diffuse from the target to the sorptive material. The greater the difference in chemical potential, the lower the equilibrium concentration in the target (i.e. the concentration in the target will approach zero with sufficient time when the difference is very large). However, if hydrogen accumulates in the sorptive material near the interface (i.e. if the hydrogen diffusivity is significantly slower in the getter than the target) the time to approach equilibrium (if desired in a given application or example of the methods described herein) can be relatively longer because the hydrogen concentration in the target near the getter-target interface is above zero and therefore the concentration gradient (part of the chemical potential gradient) will be relatively lower than the ideal case where the concentration in this location approaches zero. If the chemical potential difference between target and sorptive material is relatively high but the diffusivity is similar (or even slightly lower) the sorptive material would generally be considered effective for the purposes of the teachings described herein, while if the chemical potentials are similar and the diffusivity is faster the sorptive material would not likely be considered effective for the purposes described herein.

As an example, assume both the target and the sorptive material are 4 mm thick 'infinite' plates that have a perfect diffusion bond (e.g. welded together), where the hydrogen concentration in the target is initially 100 ppm and is initially zero in the sorptive material. If the sorptive material and target are the same material the equilibrium gas pressure and chemical potential are initially lower in the getter since it contains less hydrogen, while the hydrogen diffusivities in the getter and target are the same. In this case the sorptive material is able to approach removal of 50% of the hydrogen from the target after a relatively long time is elapsed. At equilibrium both the sorptive material and target have hydrogen concentrations of 50 ppm and the chemical potential and equilibrium gas pressure for hydrogen are the same everywhere in the system. If the initial chemical potential of the sorptive material is kept constant but diffusivity is increased, the sorptive material is still only able to remove 50% of the hydrogen, but the time required to approach the equilibrium concentration is reduced, which is beneficial for most practical applications. If the chemical potential is decreased the amount of hydrogen that can be removed from the target is increased (i.e. more than 50 ppm, perhaps close to 100 ppm if the chemical potential of the getter is very low relative to the target). Additionally, the time to reach a nominal 'removal threshold' (e.g. a 50% concentration reduction) is also reduced by decreasing the chemical potential of the sorptive material, even if the diffusivity is unchanged.

In practice, the sorptive material with the lowest chemical potential may not be selected due to cost, difficulties in achieving a diffusion bond, environmental degradation, poor mechanical properties, etc. However, for a getter to be effective for most applications it should have a lower chemical potential for hydrogen than the target (when both the target and the getter have the same hydrogen concentration) and a similar or higher hydrogen diffusivity than the target. If the difference in chemical potential is large, even a getter with a lower diffusivity could be considered effective. Some examples of suitable sorptive materials that may be considered for the teachings described herein that can have suitable hydrogen getting-capacities can include yttrium, yttrium alloys, zirconium, zirconium alloys (including alloys with high volume fractions of βZr (beta zirconium)), β-niobium and niobium alloys and the like. As discussed, the sorption pads may be formed entirely or substantially entirely from the suitable sorptive materials, or alternatively may also include the sorptive material mixed with other materials for other purposes (structural strength, oxidation resistance, etc.).

For example, in one preferred embodiment, the contact surface includes yttrium and the target object may be a zirconium alloy body (such as a part of a pressure tube nuclear reactor). Yttrium has a higher chemical affinity for hydrogen than zirconium does. While not wishing to be bound by any particular theory or mode of action, the dehydriding effect of the present method may be attributed, at least in part, to factors discussed as follows. The method may exploit yttrium's higher thermodynamic affinity for hydrogen through the in-situ application of a heated yttrium-containing sorption pad adjacent the surface of a zirconium-containing object. Hydrogen may migrate from the object and diffuse into the yttrium. The sorption pad may then be removed, leaving the object with a lower amount of hydrogen than before the treatment. For example, the object may have potentially less than 20 ppm hydrogen equivalent after treatment, as compared to before treatment, where hydrogen equivalent levels exceeding 80 ppm may be observed.

Instead of being formed from a single material and/or having a homogeneous make-up, some examples of the sorption pads described herein may be configured as a composite material, wherein at least a portion the sorption pad is comprised of the suitable sorptive material having a hydrogen getting capacity and/or a greater thermodynamic affinity for hydrogen and, for example, a selective transmission layer that can act as a protective coating for the sorptive material.

In such configurations, the selective transmission layer may form the contact surface of the sorption pad and may be the physical layer that is pressed into direct physical contact with the target surface while the apparatus is in use. In this arrangement sorptive material in the sorption pad is still considered to be in sufficient, intimate metallurgical contact with the target surface to facilitate the desired rate of migration of hydrogen despite the presence of the selective transmission layer.

The selective transmission layer can be provided in the form of a thin layer or film of a material that can be configured to permit the migration of hydrogen therethrough, to generally protect the sorptive material from the migration of oxygen and/or formation of oxides and also to facilitate improved metallurgical contact through deformation to achieve surface congruency. For example, the material used to form the selective transmission layer can itself be more resistant to the formation of surface oxide species than the bulk sorption pad material.

The selective transmission layer can be formed from any suitable material that can operate as described herein, and may be formed from a zirconium alloy, alpha zirconium, beta zirconium and the like. Such a protective, selective transmission layer can have a thickness that is be between 1 nanometer and 1 millimeter in thickness.

In accordance with the teachings described herein, in addition to the composition of the sorption pads it can also be important that the contact surfaces are pressed against the target surfaces in manner to achieve a suitable and sufficient level of preferably direct, intimate mechanical contact between the contact surface and the target surface.

This can include configuring the contact surfaces to that they are of any suitable shape and size so as to physically complement the shape and configuration of the target surface of the object. More particularly, the target surface may define a target shape and the contact surface may be configured in a sorption shape that is complementary to the target shape. For example, in some embodiments, the target surface may be curved and have a target radius of curvature. In such embodiments, the contact surface may be curved and have a sorption radius of curvature that is substantially equal to the target radius of curvature. In other examples, the target surface may be planar and the contact surface may also be planar. Other complementary shapes are also possible.

Preferably, the sorption pad has a suitably shaped contact surface that is positionable adjacent the target surface of the object. To help facilitate the desired hydrogen diffusion from the target object to the sorption pad, in order to ensure a desired level of efficacy in the treatment process, it can be desirable to ensure that there is a sufficient, mechanical engagement/contact between the contact surface and the target object surface to facilitate hydrogen migration. Preferably, this can include, in some examples, positioning the contact surface to bear directly against the target surface with a contact pressure that is high enough to ensure the desired intimate mechanical pressure/contact but that is also preferably less than the contact pressure required to induce bulk plastic deformation of the target object. In some instances a degree of deformation of the sorption pad may be desirable to help facilitate the desired metallurgical contact. The specific pressure applied may differ in different use cases. Providing this suitable intimate, mechanical contact can help achieve good metallurgical contact between the contact surface and target surface which can ensure a sufficiently rapid removal of hydrogen from the target object. In some examples, this type of metallurgical contact can be understood to include contact, without necessarily requiring adhesion, of the target surface and the contact surface where hydrogen can migrate from one to the other without requiring a gas intermediary form. This may include the exclusion of other species from contact regions (e.g. oxides), and may occur between surfaces having relatively high macroscopic and microscopic congruity. Good metallurgical contact may be achieved between mating parts having low initial congruity by applying a sufficiently large contact pressure. For example, as microscopic peaks on the material surfaces begin to contact, they can mechanically deform, forcing the mating surfaces into congruity. Alternatively, lowering initial peak height (through pre-treating the surface via material removal or reforming processes such as honing) before bringing the target and contact surfaces into engagement will act to reduce the contact pressure that is required to achieve similar congruity. Pre-treating of at least one of the target surface and the contact surface, and optionally both, may also help remove at least one of oxides and oxide-forming compounds from the target surface. This will help expose the target surface and help enhance the physical contact between the contact surface and the target surface. This pre-treatment may comprise a mechanical surface preparation technique such as mechanical scraping with a suitable cutter tool.

The metallurgical contact can be achieved differently in different examples of the methods and apparatuses described herein, and may be achieved using gravity, hydrostatic pressure, mechanical clamping/pressing devices and the like. In one embodiment of a portable apparatus, a clamping apparatus is engaged to ensure that the contact surface is in pressed into metallurgical contact with the target surface of the object. The clamping apparatus can be configured to create a sufficient metallurgic contact between the contact surface and the target surface.

Optionally, the apparatuses described herein may include a surface treating member that can be configured to remove at least one of oxides and oxide-forming compounds from the target surface. The surface treating member may be configured to mechanically engage the target surface. This may comprise mechanically scraping the target surface with the surface treating member. In some embodiments, the surface treating member may be connected to and moveable with the sorption pad and/or other movable portions of the apparatus such that the surface treating member may pass over and treat the target surface before the sorption pad reaches and engages with the target surface.

To help reduce the likelihood of further oxidation of the target surface during the dehydriding process, the atmosphere in a treatment region around the target surface and the contact surface (e.g. the interior of a fuel channel) may be modified to reduce its oxygen content, preferably to less than about 20% wt or such that it has an oxygen partial pressure less than 20 kPa. In some embodiments, an inert gas may be introduced into the treatment region around the target surface and the contact surface. This may have particular relevance for embodiments where the target surface has been mechanically prepared to improved surface reaction contact. The inert gas may comprise argon, helium, nitrogen and the like.

In addition to providing the desired metallurgical contact between the surfaces the methods and apparatuses described herein may also include modifying the temperature at the interface between the target and contact surfaces to help facilitate hydrogen migration. In some examples described herein, the interface between the target surface and the contact surface can be configured to be at a pre-determined treatment temperature that is preferably selected to help facilitate the migration of hydrogen from the target object into the sorption pad. As such migration may tend to increase proportionally with the interface temperature the interface can, optionally, be heated to a treatment temperature that is greater than about 200 degrees Celsius. In most engineering materials, hydrogen diffusion increases with increased temperature. However, high temperatures may act to permanently and negatively impact mechanical properties, such as strength, through annealing or similar processes. Ideal target temperatures are those which maximize hydrogen transport, while minimizing these potential negative effects of heating the target. In some circumstances, the treatment temperature may be between about 250 degrees Celsius and about 350 degrees Celsius.

This heating process may be effected by a separate heater, or it may be the result of allowing heating through ambient heat. For example, in some embodiments, where an independent heating source is required, a heater may be configured to heat an interface between the target surface and the contact surface to a treatment temperature for a migration time. In some embodiments, the heater may be operable to heat at least one of the target surface and the contact surface. For example, the heater may include resistive, electric heating coils positioned to be in contact (or optionally disposed within) the sorption pads that can be energized when heat is desired. Alternatively, heating fluid conduits can be in contact with (or optionally disposed within) the sorption pads and a relatively warm heating fluid can be circulated through the conduits. The source of the heating fluid may be disposed inside the pressure tube or may be external the pressure tube.

Alternatively, the methods described herein may be carried out in an environment in which the ambient temperature is within the desired treatment temperature range. For example, the methods described herein may be performed on a pressure tube and/or suitable portion of a fuel channel in a pressure tube nuclear reactor, such as a CANDU-type reactor, while the reactor is online such that the surface that is being treated is at approximately the same temperature as the primary heat-transport fluid while the method is performed (described further herein). This may reduce and/or eliminate the need to provide a separate heating apparatus and/or to perform a separate heating step in the treatment method.

Preferably, the intimate, metallurgical contact between the contact surface and the target surface can be maintained while the target surface is at the treatment temperature and for the duration of one treatment cycle, e.g. for a treatment time.

Optionally, the sorption pad may be removed and analysed to determine the content of hydrogen and/or its isotopes in the pad after treatment; hence allowing a non-destructive means for assessing the initial hydrogen content of the target object or a desired region thereof, pre-treatment.

Testing was conducted to be illustrative of the methods and apparatus described herein. In this testing a series of zirconium alloy samples 4.2 mm in thickness containing high levels of hydrogen (>65 ppm [H]eq) were treated in intimate, metallurgical contact with a yttrium sorption pad under varying time and temperature conditions. The table below shows the effective concentration hydrogen (equivalent) in the zirconium alloy samples after treatment, as a function of both treatment time and treatment temperature. The experimental data generated in this case clearly shows the efficacy of a yttrium sorption pad in significantly reducing equivalent hydrogen concentrations in a zirconium alloy sample containing significant levels of hydrogen, under suitable time and temperature treatment conditions.

| | [H]eq (ppm) | | | |
|---|---|---|---|---|
| Time (h) | 250° C. | 300° C. | 350° C. | 400° C. |
| 0 | 66.5 | 66.5 | 66.5 | 66.5 |
| 5 | 55 | 45.5 | 41 | 36.5 |
| 10 | 51 | 36.5 | 30.75 | 25.5 |
| 15 | 47.5 | 29.5 | 23.5 | 19.5 |
| 20 | 44.5 | 24 | 18.25 | 16.25 |
| 25 | 42.25 | 19.5 | 14.5 | 14 |
| 30 | 40 | 15.5 | 12.5 | 13 |
| 35 | 38 | 12.5 | 10.75 | |
| 40 | 36 | 10 | 9.5 | |

In a second experiment, a zirconium disc was brought into metallurgical contact with a simulated zirconium hydride layer adjacent a yttrium sorption pad disc. After compression, the sample set-up was heated to 400 degrees Celsius for 48 hours. Subsequent analysis was unable to find evidence of any hydrogen in the zirconium sample (detection limits <5 ppm) even though the simulated zirconium hydride layer was no longer visible This data clearly indicates the efficacy of the yttrium sorption pad in absorbing hydrogen species introduced into the zirconium alloy system.

In a third experiment, hydrided zirconium disc samples were prepared such that the average hydrogen concentration in the zirconium was approximately 180 ppm. These samples were each placed adjacent discs of yttrium getter material. Each getter-sample pair was compressed (at a contact pressure of ca. 67 MPa) and heated to 300 degrees Celsius for varying periods of time. The table below shows the efficacy of the yttrium getter as a sorption pad in removing hydrogen from the hydrided zirconium samples as a function of treatment time. A cover gas was not used for these experiments. The inventors expect similar or increased hydrogen removal under an inert atmosphere.

| Time at 300 degrees Celsius (hrs) | [H] (ppm) | Average [H] (ppm) | [H] Removed (ppm) | Removal Rate (ppm/hr) |
|---|---|---|---|---|
| 0 | 188 | 178.3 | 0 | 0 |
| 0 | 170 | | | |
| 0 | 177 | | | |
| 10 | 155 | 155.0 | 23.3 | 2.3 |
| 24 | 140 | 135.5 | 42.8 | 1.8 |
| 24 | 131 | | | |
| 50 | 54 | 54.0 | 124.3 | 2.5 |

Referring to FIG. 1, one example of a method 200 of removing hydrogen interstitially dissolved within an object includes at step 202 positioning a sorption pad that is made out of a suitable sorptive material (such as pad 106 below) and includes suitably shaped contact surface (such as surface 110) so that its contact surface is adjacent the first target surface on an object to be treated (such as the inner surface of a pressure tube 400—see FIG. 8A). The contact surface is preferably configured to be complementary to a shape of the first target surface (e.g. generally convex if designed to treat a generally concave inner tube surface).

Figure 8A:
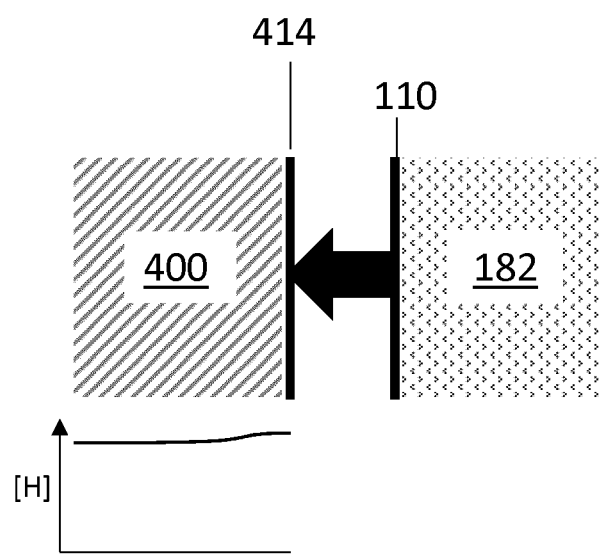
FIG. 8A is a schematic representation of a sorption pad adjacent a target surface.
Figure 8B:
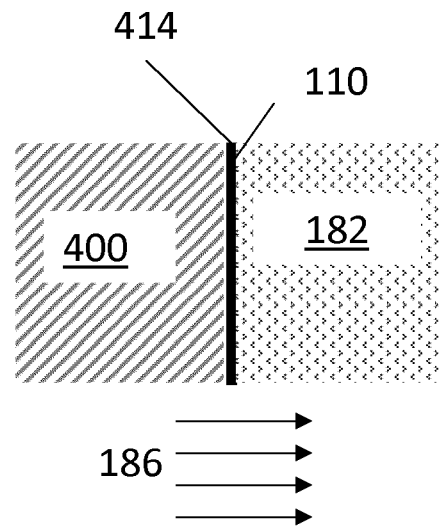
FIG. 8B is a schematic representation of a sorption pad in metallurgical contact with a target surface.
Figure 8C:
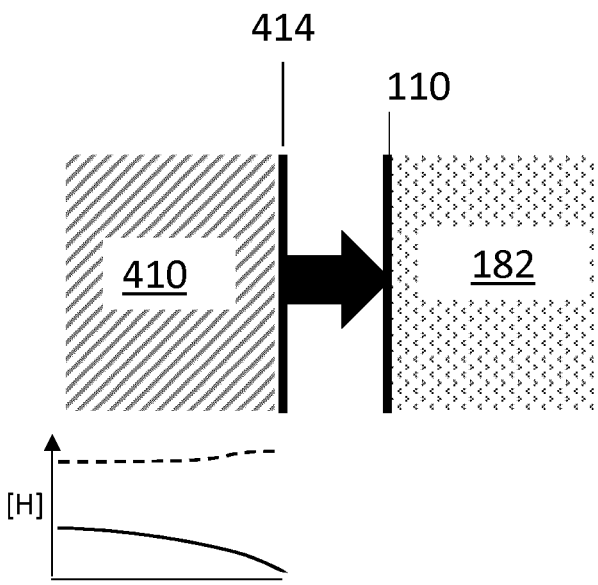
FIG. 8C is a schematic representation of a sorption pad having been separated from a target surface.

Referring to also to FIGS. 8A-8C, a schematic representation of the sorption pad 106 and a section of the pressure tube 400, including the target surface 414 are shown. FIG. 8A shows the sorption pad 106 in registration with the target surface 414 but with the contact surface 110 still spaced from the target surface 414 in a pre-treatment location. A graph illustrating a representation of the hydrogen concentration in the pressure tube 400 is also included, showing that the concentration of hydrogen may be uniform or have a slight gradient prior to treatment in the region that is adjacent the target surface 414.

FIG. 8B shows a condition in which the contact surface 110 is in metallurgical contact with the target surface 414 such that hydrogen can migrate from the pressure tube 400 to the sorption pad 106, as shown by arrows 186. FIG. 8C illustrates when the treatment according to the methods herein is substantially complete and the contact surface 110 is separated from the target surface 414. A graph illustrating a representation of the hydrogen concentration left remaining in the pressure tube 400 is also included, showing how the concentration is lower than that shown in FIG. 8A (and as shown via the dashed reference line) and that the concentration of hydrogen is now lower in the region that is adjacent the target surface 414 than in the bulk of the body of the pressure tube. While reference to the sorption pads 106 and pressure tube 400 is included for clarity, the schematics in FIGS. 8A-8C could also represent any other sorption pad and target surface/object, and neither the method 200 nor the concepts illustrated in these schematic figures are limited the examples and embodiments described herein.

Referring again to FIG. 1, at step 204, the method 200 includes urging the contact surface into metallurgical contact with the target surface using any suitable clamping apparatus (FIG. 8B). This step is preferably conducted while an interface between the target surface and the contact surface is at a pre-determined treatment temperature, such as a temperature that is greater than about 200 degrees Celsius.

If prior to step 204 the first target surface is at an initial temperature that is less than the desired treatment temperature the method may include the optional step 206 of heating at least one of the sorption pad and the target object using a heating apparatus to raise the temperature of the interface between the first target surface and the contact surface from the initial temperature to the treatment temperature. If the target surface is already at the treatment temperature this step 206 may be omitted.

The metallurgical contact between the first target surface and the contact surface can be maintained while the interface is at the treatment temperature for the pre-determined treatment period, during which the hydrogen can migrate from the target object to the sorptive material.

At the conclusion of the desired treatment period, the method can proceed to step 208 in which the contact surface is separated from the first target surface and the sorption pad and any hydrogen sequestered therein is moved away from the object (see FIG. 8C). The object can then be returned to its intended use.

If desired, the method may also include, at optional step 210, pre-treating the target surface prior to step 202 to help remove at least one of oxides and oxide-forming compounds from the target surface thereby exposing the zirconium alloy to enhance the mechanical contact between the contact surface and the target surface. This may be done by mechanically scraping the target surface with a scraping tool shortly prior to step 202, or via other suitable techniques.

If desired, the method may also include, at optional step 212, providing a modified atmosphere having less than 20 kPa oxygen partial pressure around the interface between the target surface and the contact surface during at least a portion of the treatment period. This modified atmosphere may include introducing an inert cover gas into the treatment region around the interface between the target surface and the contact surface. The cover gases can optionally be removed at the conclusion of the treatment period (e.g. at the conclusion of step 208) so that the object can be returned to its pre-treatment state.

Optionally, the method may include, at optional step 214, heating the sorptive material to a regeneration temperature for a regeneration time. This can allow hydrogen that was absorbed within the sorptive material during the treatment period to migrate out of the sorptive material, thereby reducing an amount of hydrogen sequestered within the sorptive material.

The steps 202-208 may be repeated using additional sorption pads (or alternatively regenerated sorption pads) to treat additional target surfaces as many times as desired. The method may include after step d), The sorptive material used in this method may be any suitable material, and may include yttrium, and preferably may include at least 70% wt yttrium.

The sorption pads used in this method may be configured so that the contact surface is formed from the sorptive material, or alternatively the contact surface in this method may include a selective transmission layer that covers the sorptive material and is disposed between the sorptive material and the target surface during the treatment period. The selective transmission layer may be configured to permit the migration of hydrogen therethrough and to inhibit the migration of oxygen, whereby oxidation of the sorptive material in the sorption pads can be at least partially inhibited.

The treatment temperature for step 204 may be greater than 250 degrees Celsius, and may be greater than 350 degrees Celsius.

The treatment period or duration of step 204 may be less than 30 days, and may be less than 120 hours and may be less than 48 hours.

Figure 2:
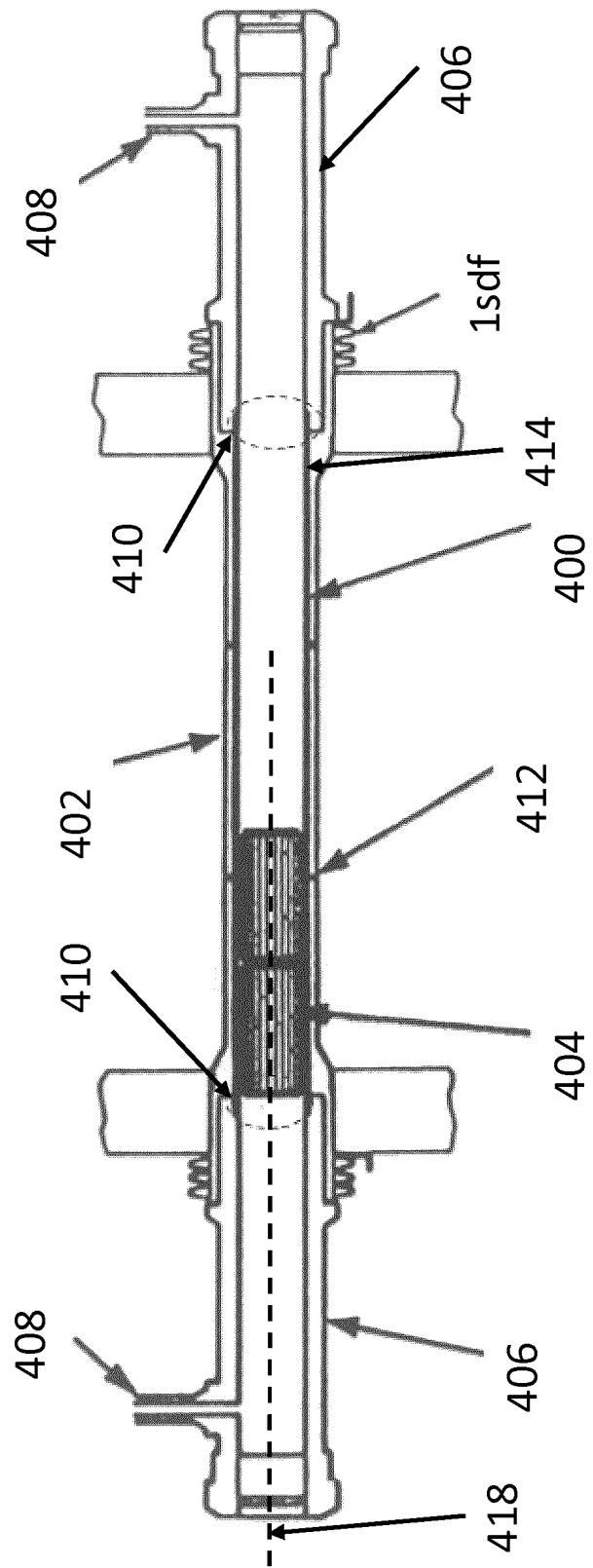
FIG. 2 is a schematic example of a pressure tube suitable for use in a pressure tube nuclear reactor.

As an additional example, the object being treated with method 200 may include a pressure tube installed within a pressure tube type nuclear reactor, such as the pressure tube 400 (FIG. 2). The pressure tube 400 extends along its tube axis 418 between a first end connected to a first end fitting 406 that is a different material than the pressure tube 400 via a first joint 410 and an opposed second end. The target surface may be an inner surface 414 of the pressure tube 400 proximate the first end fitting 406 (to the right as illustrated in FIG. 2—but it could be the other end in other examples— or both ends simultaneously if two treatment apparatuses are provided). Step 202 may then include inserting the sorption pad within an interior of the pressure tube 400 while the pressure tube is in situ within the nuclear reactor. Step 202 may therefore include passing the sorption pad through an interior of the first end fitting 406 to reach the surface 414 in the interior of the pressure tube 400. Step 204 may then include pressing the contact surface radially outwardly against the target surface 414.

These method steps may be completed while the nuclear reactor is offline, or alternatively may be completed while the nuclear reactor is online.

Prior to step 202, the method may include draining a coolant liquid from the interior of the pressure tube 400 to expose the first target surface.

The apparatuses used to perform the treatment methods described herein may have a variety of different configurations depending, at least in part, on the shape and features of the target object that is to be treated, as well as on other factors such as the nature of the operator, the expected environmental conditions in which the apparatus is to be used, the need for an integrated heating apparatus and the like. For example, an apparatus that is intended to remove hydrogen from the outer surfaces of a metal pipe or tube may be configured differently than an apparatus intended to remove hydrogen from the inside surface of a pipe or tube or than an apparatus intended to remove hydrogen from a generally flat plate or wall. The mechanism used to clamp the contact surface against the target surface may also vary based on application (and may include mechanical, hydraulic, pneumatic or other types of clamping devices), as can the treatment temperatures and times.

In some examples, a portable apparatus for removing hydrogen interstitially dissolved within an object (such as a metallic object including a zirconium alloy) can include one or more suitable sorption pads, each having a body that includes a suitable sorptive material and having a generally outwardly facing contact surface. The contact surface can be positionable opposite a target surface on the object to be treated and can be configured to be complementary to a shape of the target surface. The apparatus can include any suitable clamping apparatus that is operable to selectably move the sorption pad between i) a retracted position and in which the contact surface is spaced apart from the target surface and the apparatus is movable relative to the object and ii) a deployed position in which the contact surface is urged into metallurgical contact with the target surface and movement of the apparatus relative to the object is inhibited.

The apparatus also preferably includes a controller that is configured to control at least the clamping apparatus, and may also control other features—such as the surface treatment apparatus and the like.

When this apparatus is in use, and when a first treatment period is initiated, the contact surface is moved to and maintained in the deployed position whereby metallurgical contact between the contact surface and the target surface is achieved and hydrogen migrates from the target object to the sorptive material during the treatment period. When the first treatment period is complete the contact surface is moved to the retracted position and the apparatus can be moved away from the target object.

Optionally, the apparatus can include a heater that can be used to heat the interface between the contact surface and the target surface to the pre-determined treatment temperature that is preferably greater than about 200 degrees Celsius, and more preferably greater than 250 degrees Celsius during the treatment period. The heater can be configured to heat at least one of the sorption pads and the target surface directly, and the other may be heated by conduction. For example, the heater may be configured to heat the sorption pads, and heat can then be conducted to the target surface via the sorptive material.

Optionally, the contact surface on the sorption pad may be made entirely of a single sorptive material. Alternatively, the contact surface may include a selective transmission layer that covers the major sorptive material and is configured so that the selective transmission layer is disposed between the major sorptive material and the target surface when the sorption pad is in the deployed position. The selective transmission layer may be formed from a different material than the major sorptive material and is preferably configured to permit the migration of hydrogen therethrough and to inhibit the migration of oxygen.

Depending on its expected operating environment, the portable dehydriding apparatus may also include a sealing apparatus that is adjacent the sorption pad. The sealing apparatus can be configurable in i) a transport configuration in which the sealing apparatus is positionable proximate the target surface (e.g. it is not engaged with the target object) and ii) a deployed configuration in which the sealing apparatus seals with the object to fluidly isolate a treatment region/volume containing the target surface and contact surface from the ambient environment. The sealing apparatus can be maintained in its deployed configuration during the treatment period and can be returned to its transport configuration at the conclusion of the treatment period. If a sealing apparatus is provided, the apparatus may also include any suitable gas supply system (including a gas source, hoses and conduits, valves, pumps and the like) configured to introduce a non-oxidizing cover gas into the treatment region so that the treatment region has less than 20 kPa oxygen partial pressure at least during the treatment period. Some suitable cover gases can include helium, nitrogen, argon and mixtures thereof.

As one possible example, the sealing apparatus can include at least a first inflatable sealing gasket or other sealing features, and may include multiple gaskets or the like. When the sealing apparatus is in the transport configuration the sealing gasket can be deflated to help provide clearance between the apparatus and the target object. When the sealing apparatus is in the deployed configuration the sealing gasket can be extended/inflated and to bear against the object to at least partially seal the treatment region.

If pre-treating the target surface is desired, the portable dehydriding apparatus may optionally include a surface treating member that can be used to engage the target surface prior to the treatment period to remove at least one of oxides and oxide-forming compounds from the target surface before the contact surface is moved to the deployed position. This may include mechanical scrapers or the like, and may also include chemical surface treatments if appropriate.

Preferably, the surface treating member can be connected to and movable with the sorption pad so that when the sorption pad is translated into a position proximate the target surface the surface treating member passes over and treats the target surface before the sorption pad is registered with the target surface. This may help simplify the use of the apparatus and may reduce the need for separate pre-treatment tools or the like.

Referring to FIGS. 3-6, one example of a portable dehydriding apparatus 100 is shown. The apparatus 100 is configured to be used to remove hydrogen interstitially dissolved within a target surface of a pressure tube or other suitable portion of a fuel channel in a pressure tube nuclear reactor, such as the pressure tube 400 in a CANDU-type reactor. Optionally, the apparatus 100 can be configured so that it can be used to remove hydrogen from a pressure tube in situ within a nuclear reactor, and optionally when one or more fuel bundles are still positioned within the fuel channel that is being treated. When fuel bundles are located within the pressure tubes it is preferable that coolant flows through the pressure tubes, even if the reactor is offline and not being used to generate power. It is therefore preferable that the apparatus 100 is configured to allow hydrogen to be removed from a selected target area (such as surface 414), while still allowing a desired amount of coolant to flow through and/or bypass the target area. Pressure tubes 400 in CANDU reactors may be formed from zirconium or a zirconium alloy, and the apparatus 100 can be used to remove hydrogen from such materials.

In the present example, the apparatus 100 generally includes an internal engagement portion 102 having components that are configured to be at least partially inserted within the interior of a given pressure tube 400 when the apparatus is in use, and preferably remain in place within the pressure tube 400 during the duration of the treatment process (e.g. for the treatment period). Preferably, in addition to the components in the internal engagement portion, the apparatus 100 also includes an external portion 104 having components that are intended to remain at least partially exposed and/or accessible from outside the pressure tube when the apparatus is in use. This may be preferable for components that are to be accessed by users and/or need not be located within the relatively harsh environment within the pressure tube and/or in immediate proximity to a reactor generally. This may include, for example, controllers and computers (such as controller 128) having suitable processors, memories and operating systems (which may also include PLCs as well as any suitable signal processing and communication devices), hydraulic and/or pneumatic system components such as pumps, motors, cover gas supply containers, compressors and fluid reservoirs, user display and feedback apparatus and the like. It may also include sealing or containment devices that can help at least temporarily seal the interior of the pressure tube while the apparatus 100 is in use.

Sorption Pads

Referring first to the internal engagement portion 102 of the apparatus 100, in this example the apparatus 100 includes four sorption pads 106 located toward an inner end 108 of the apparatus 100. The sorption pads 106 each have a body (see body 182 in FIG. 7) that includes the sorptive material and an outwardly facing contact surface 110 that is shaped to correspond to the inner surface 414 of the pressure tube 400 to be treated so that is generally complementary and can be pressed into intimate, mechanical contact with the inner surface of the pressure tube. The sorption pads 106 are mounted on and supported by a central hub 112 that extends generally axially, along an apparatus axis 114. In this example the hub axis 114 is substantially aligned with the axis 418 of the pressure tube 400 when the hub 112 is inserted within the pressure tube 400.

To facilitate the sorption of hydrogen from the target surface 414, the sorption pads 106 are configured, in this example, to include at least 70% wt yttrium.

Figure 7:
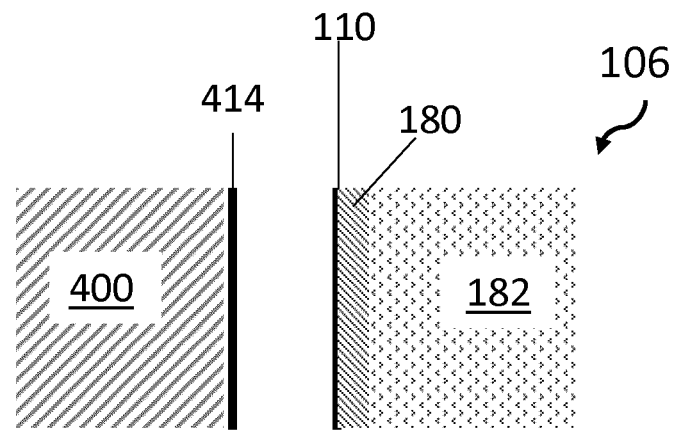
FIG. 7 is a schematic representation of a cross-section of a sorption pad with a selective transmission layer.

The sorption pads may also comprise a composite material wherein the body of the sorption pad is comprised of the sorptive material; and the contact surfaces 110 are protected by selective transmission layer that, in this example, is a layer of a more oxide-resistant material that overlies and covers the sorptive material. Referring also to FIG. 7, a schematic example of a cross-section of one of the sorption pads 106 is illustrated showing the pad 106 having body portion 182 that includes the sorptive material and a transmission layer 180 that overlies the body portion 182 and provides the contact surface 110 in this example. Such an oxide-resistant material that can still allow the desired metallurgical contact may be, for example, a zirconium alloy. Such an oxide-resistant layer may be between about 1 nanometer and about 1 millimeter in thickness. Optionally, the sorption pads may, in some examples, be formed from a metal alloy containing at least about 95% yttrium by mass, and optionally with about 99% or greater yttrium by mass being more preferable in some circumstances.

Preferably, the sorption pads 106 are spaced circumferentially apart from each other, around the axis 114 so as to provide a substantially continuous outer surface, i.e. the combination of the contact surfaces 110, that can simultaneously contact substantially the entire inner perimeter of the pressure tube at the target treatment location 414. While some gaps may remain between the sorption pads 106 when the apparatus is in use, during the treatment process hydrogen that is located in portions of the pressure tube that lie within such a gap may tend to migrate to the one of the sorption pads 106, whereby substantially and possibly the entire target surface of the pressure tube may be simultaneously treated using the apparatus 100.

Each pad 106 has a circumferential width 116 (FIG. 4) that can be selected based on the geometry of the pressure tube 400 to be treated. Each pad 106 also has an axial length 118 that can be selected based on a desired axial treatment length (i.e. a length of the inner surface of the pressure tube that is desired to be contacted during a single treatment process).

Optionally, each sorption pad 106 may have a uniform configuration along its depth in the radial (i.e. generally inward) direction. Alternatively, the contact surfaces 110 may be mounted on and supported by a suitable backing portion that may have different mechanical properties. For example, the backing portion may be stronger that the material forming the contact surface 110 and/or may be configured to accommodate and/or be connected to other components of the apparatus 100. In the illustrated example, the sorptive material in the body of the sorption pads 106 are supported by suitable backing plates 120.

Preferably, to help facilitate insertion of the inner end 108 within a pressure tube, the sorption pads 106 can be movable in the radial direction toward and away from the hub 112 (i.e. inwardly and outwardly). This can allow the pads 106 to be generally retracted inwardly to provide radial clearance between the contact surfaces 110 and the inner surface of the pressure tube during insertion and/or removal. When the pads 106 are in their desired location within the pressure tube they can then be deployed radially outwardly so as to be pressed into contact with the surface of the pressure tube. The apparatus 100 can include any suitable clamping apparatus that can be selectably operated to move the pads 106 in this manner.

In the present example, the apparatus 100 has a clamping apparatus that includes a plurality of hydraulic actuators 122 mounted on, and extending radially outwardly from the hub 112, with each pad 106 being mounted on a distal end of a respective one of the actuators 122. The actuators 122 can be connected to a suitable hydraulic power apparatus 124 (FIG. 3) by an umbilical conduit 126 to provide the hydraulic fluid to motivate the actuators 122. The hydraulic fluid may be any suitable fluid, and preferably may be water and more preferably may be heavy water (deuterium $D_2O$). This may be beneficial if the apparatus 100 is used within a CANDU reactor, as heavy water is already present within the fuel channels of a CANDU reactor. In this configuration, if any hydraulic fluid should leak from the apparatus 100 it may not substantially contaminate the interior of the reactor.

In the illustrated example, the actuators 122 can be operated so that the sorption pads 106 are moved between a retracted position, in which the contact surface 110 is spaced apart from the target surface of the object, and a deployed position, in which the contact surface 110 is in direct intimate mechanical contact with the target surface of the object. Optionally, the hydraulic actuators 122 may be individually actuatable, which may allow each pad 106 to be retracted and extended individually. Alternatively, the hydraulic actuators 122 may be synchronized so that the pads 106 extend and retract in unison.

The umbilical conduit 126 can extend from the hub 112 to a location outside the reactor fuel channel. The umbilical conduit 126 preferably includes a flexible hose portion that can carry hydraulic fluid and may also include electrical cables, pneumatic conduits, cover gas/atmosphere control and other process, control or instrumentation connections. Grouping two or more different connections within a common umbilical conduit 126 may help reduce the number of separate conduits that are required to extend from the interior of the pressure tube to the exterior of the pressure tube when the apparatus 100 is in use. For example, the umbilical conduit 126 may be connected to an apparatus controller, shown schematically using reference character 128, that can be positioned outside the pressure tube when the sorption pads 106 are within the pressure tube.

While shown with four, curved sorption pads 106 in the present example, other embodiments of a portable dehydriding apparatus may include 1, 2, 3, or more than four sorption pads, and the sorption pads may have different shapes. The shape of the sorption pads may be selected to generally correspond to the shape or profile of the object from which hydrogen is to be sorbed. For example, a dehydriding apparatus configured to extract hydrogen from a relatively large, flat object may include only a single, generally flat sorption pad.

Scraper

Optionally, depending on the condition of the target surface, it may be desirable to pre-treat the target surface to help ensure a desired degree of mechanical contact/engagement between the contact surfaces 110 and the target surface can be achieved before engaging the sorption pads 106. For example, it may be desirable to ensure that the interfacing surfaces (i.e., the target surface and the contact surface 110) are relatively free of oxides and oxidizing species. It may therefore be preferable to pre-treat the target surface to remove at least one of oxides and oxide-forming compounds from the target surface before the contact surface 110 engages with the target surface. Therefore, in some embodiments, the apparatus may include a surface treating member that can be configured to remove at least one of oxides and oxide-forming compounds from the target surface. Optionally, the surface treating member may be configured to scrape a layer of material from the target surface (i.e. scrape to a target scraping depth) that may be between about 10 and 150 microns, preferably may be about 80 microns.

In the illustrated example, the apparatus 100 has a surface treating apparatus that includes a mechanical scraping apparatus 130 which is supported by the hub 112. The mechanical scraping apparatus 130 is configured, like the sorption pads 106, to fit within the interior of a pressure tube and to scrape along the inner surface of the pressure tube in the target treatment region. Preferable, the mechanical scraping apparatus 130 is configured to only lightly scrape the surface of the pressure tube, such that oxides and other contaminants can be removed without damaging or weakening the pressure tube.

In the illustrated arrangement, the mechanical scraping apparatus 130 includes two scraping units 132 that are mounted on opposing sides of a carrier collar 134. The collar 134 is, in this example, rotatably mounted on the hub 112 such that it, and the scraping units 132 mounted thereon, can rotate about the hub axis 114, as illustrated by arrow 136. This rotary arrangement can allow the scraping units 132 to sweep across a ring-like section on the inner surface of the pressure tube. Positioning the scraping units 132 on opposing sides of the collar 134 may help the collar 134 stay rotationally balanced when the apparatus is in use. While the apparatus 100 is shown with two scraping units 132, in other configurations it may include only a single scraping unit 132, more than two scraping units 132 or optionally the apparatus 100 may not include any type of surface treating apparatus and the surface pre-treatment may be completed using a separate tool.

In the illustrated example, each scraping unit 132 includes a scraper 138 that is configured to scrape against the inner surface of the pressure tube to remove the oxide layer. The scraper 138 may be made from any suitable material, including metal, carbide, tungsten carbide, composites and other suitable materials. Optionally, each scraping unit 132 may also include a debris container 140 that can be positioned adjacent the scraper 138 and can collect and retain any debris that is scraped from the surface of the pressure tube. This may help prevent loose, scraped debris from fouling the treatment area and/or may help reduce the chances that loose, scraped debris could become lodged between a sorption pad 106 and the surface of the pressure tube. The debris containers 140 may be emptied when the apparatus 100 is removed upon completion of a surface treatment.

The collar 134 may be rotated using any suitable means, and in the illustrated example can be hydraulically motivated to rotate about the axis 114. In other examples, the collar 134 may be driven by an electric motor, mechanical linkage or other suitable mechanism.

Preferably, at least one of the scraping unit 132 and the group of sorption pads 106 can be translatable axially along the axis 114, relative to the other of the scraping unit 132 and the group of sorption pads 106. That is, preferably the scraping unit 132 can be used to pre-treat a specific portion of the inner surface of the pressure tube to remove the oxide layer, and then the sorption pads 106 can be pressed into contact with the same, scraped section of the pressure tube.

While shown as being generally inboard (e.g. towards the center of the pressure tube) of the sorption pads 106 as illustrated in FIGS. 3-6, the scraping unit 132 it may be alternatively be located outboard of the sorption pads 106 (e.g. axially between the sorption pads 106 and the end fittings) and/or may be provided on a separate portion of the apparatus 100 that can be moved and used independently of the sorption pads 106. For example, the mechanical scraping apparatus 130 may be inserted into the pressure tube to pre-treat the target surface and then removed from the pressure tube before the sorption pads 106 are inserted.

Sealing and Isolating a Treatment Region

Preferably, the target surface (e.g. surface 414) that is to be treated can be isolated from its ambient environment within a treatment region/volume having desirable characteristics. For example, it may be preferable that the region surrounding the sorption pads 106 when the apparatus 100 is in use is free from liquids (i.e. coolant) and optionally may be a low-oxygen environment to help reduce the formation of oxides or other such contaminants during the treatment process. In some examples, the treatment region may be flushed so that air or liquids are removed, and the treatment region is then generally evacuated and/or may be provided with a generally inert (i.e. non-oxidizing) cover gas. In circumstances where the pressure tube would be generally full of coolant, establishing the treatment region may include sealing a portion of the interior of the pressure tube to fluidly isolate it from adjacent regions, and then modifying the conditions within the sealed treatment region to provide desirable treatment conditions. This may be done using a suitable sealing apparatus.

In the illustrated example, the apparatus 100 incorporates an example of a sealing apparatus that includes two sealing discs 142 that are axially spaced apart from each other, on opposing sides of the scraping unit 132 and the sorption pads 106 and can bound a treatment region when the apparatus 100 is in use.

The sealing discs 142 each include a generally impermeable body portion 144 that is surrounded by an extendible sealing gasket 146, that is inflatable using a fluid in this example but could have other configurations. The sealing gaskets 146 can be provided with hydraulic fluid via a hydraulic fluid supply line that can be included in the umbilical conduit 126, and can be selectably configured between an engaged position in which the sealing gaskets 146 bear against the inner surface of the pressure tube thereby fluidly isolating the treatment region (axially between the sealing discs 142) from the rest of the pressure tube, and a retracted position in which sealing discs 142 can be axially translated within the pressure tube. In an alternative embodiment, the extendible/inflatable sealing gasket 146 may be provided with air via a pneumatic supply line that can be included in the umbilical conduit 126, functioning in a similar manner.

Preferably, the sealing apparatus can also include some suitable type of fluid passage so that any fluid, either coolant liquid or gas in the example illustrated, that becomes isolated between the sealing discs 142 when they are engaged can then be removed from the treatment region, and optionally replaced with a suitable gas. This can allow the apparatus 100 to be inserted into a pressure tube that is filled with coolant liquid, for the sealing gaskets 146 to be engaged thereby trapping a volume of coolant liquid within the treatment region, and then for the trapped coolant liquid to be removed from the treatment region.

Figure 3:
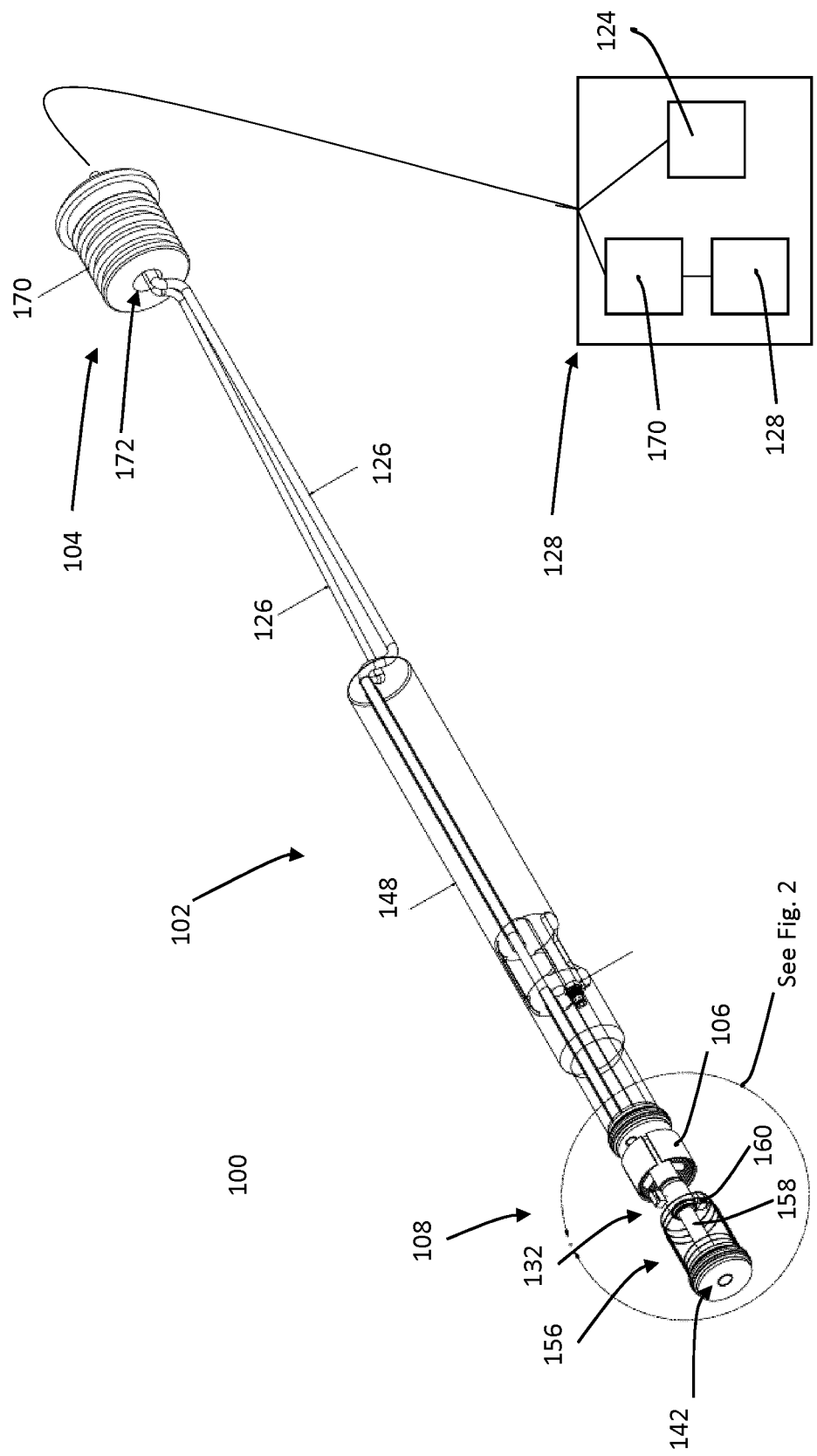
FIG. 3 is a perspective view of one example of a portable dehydriding apparatus.
Figure 4:
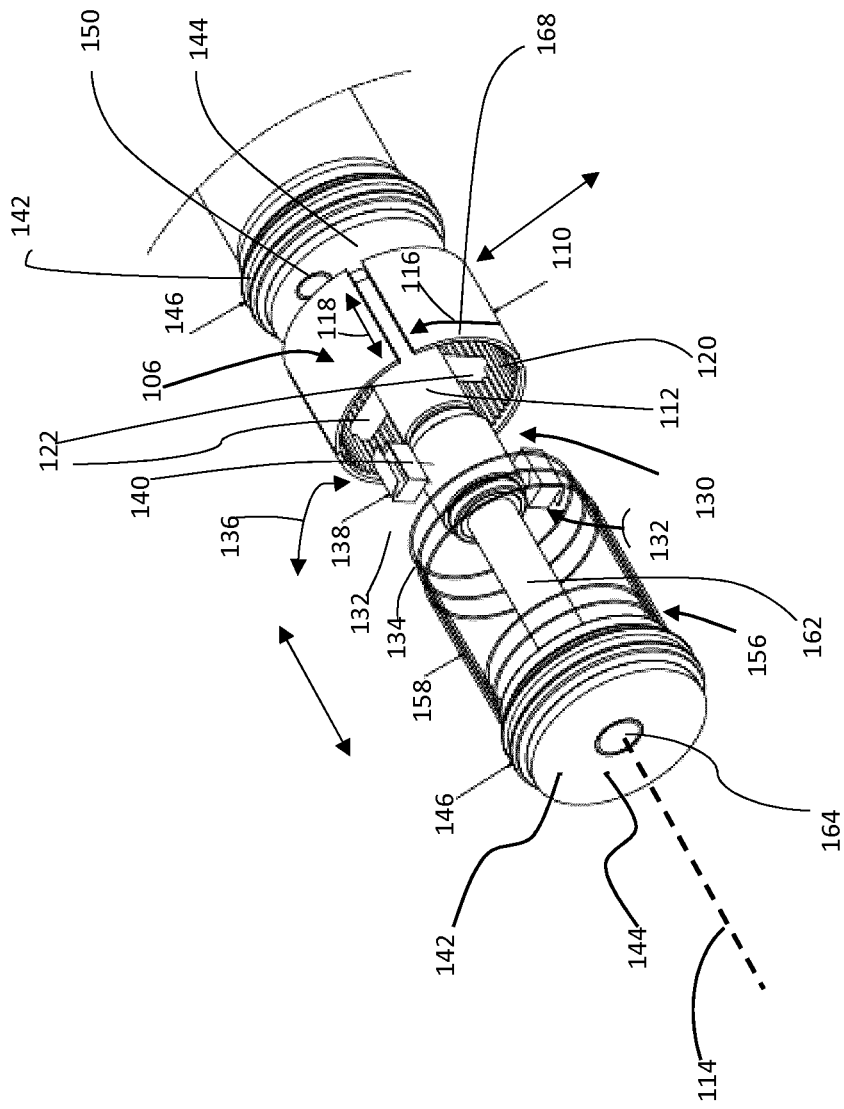
FIG. 4 is an enlarged view of a portion of the apparatus of FIG. 3.

In the illustrated example, the outboard sealing disc 142 (to the right as illustrated in FIGS. 3, 4 and 6) includes a fluid aperture 150 that extends through the disc 142 and is connected to a fluid conduit 154 (FIG. 6). The conduit 154 can be connected to any suitable suction source whereby any liquid or gas caught between the sealing discs 142 when the gaskets 146 are inflated/deployed can be withdrawn from the treatment region. Optionally, the fluid conduit 154 may also be connectable to a cover fluid source, such that a suitable cover fluid (such as an inert gas) can be provided to fill the in the treatment region after the coolant liquid (or any other gas, etc.) has been removed.

Protective Sheath

Optionally, the apparatus 100 may include a protective cover that can be used to cover and protect the sorption pads 106, and optionally the mechanical scraping apparatus 130 when the apparatus 100 is not in use, and preferably as the apparatus 100 is being inserted into and/or removed from the interior of the pressure tube. This may help reduce the chances of the sorption pads 106 and/or the mechanical scraping apparatus 130 inadvertently contacting the pressure tube or other structures, which may help prevent damage to the apparatus 100 or the structures that it contacts.

Preferably, if a protective cover is provided it can be retracted or otherwise moved into a stowed position to expose the sorption pads 106 and/or the mechanical scraping apparatus 130 when the apparatus 100 is in use. In the illustrated example, the apparatus 100 has a protective cover that includes a sheath 156 that includes a fixed portion 158 and a retractable portion 160 that can translate in the axial direction. In this example, the retractable portion 160 can be slid between an extended position (not shown) in which it encloses the sorption pads 106 and the mechanical scraping apparatus 130, and a retracted position (FIGS. 1, 2 and 4) in which the sorption pads 106 and the mechanical scraping apparatus 130 are exposed.

Coolant Bypass

In some circumstances it may desirable to allow coolant to flow through a pressure tube while the apparatus 100 is in use. For example, if the apparatus 100 is used while nuclear fuel is still present within the pressure tube being treated and/or in other adjacent pressure tubes then allowing coolant to flow through the pressure tube, without filling the treatment region or contacting the sorption pads 106 while they are in use may be desirable.

Accordingly, the apparatus 100 is preferably configured to include a coolant bypass apparatus that can allow coolant to flow from one side of the treatment region to the other without contacting the sorption pads 102. In the illustrated example, the coolant bypass apparatus includes a bypass conduit 162 (FIGS. 2 and 4) that extends through the hub 112 and beyond the sealing discs 142, between opposed ends 164 and 166. When the apparatus 100 is in use, the ends 164 and 166 of the conduit 162 can be positioned so that they are in fluid or open-path communication with portions of the interior of the pressure tube that are on opposing sides of the sealed, treatment region between the sealing discs 142. This can allow coolant liquid on one side of the sealed treatment region to flow through the conduit 162 to reach the other side of the treatment region. In this example, one end 164 of the conduit 162 is an opening in the sealing disc 142, while the other end 166 is spaced apart from the other sealing disc 142.

The conduit 162 can be sized to accommodate a desired coolant liquid flow rate. Preferably, the mechanical scraping apparatus 130 can be rotatable around the outside of the conduit 162.

Optional Heating Apparatus

Preferably, when the apparatus 100 is in use the sorption pads 106 and target surface on the pressure tube can be heated to a desired treatment temperature that can help facilitate the migration and removal of hydrogen. The treatment temperature may be between about 200 degrees Celsius and about 600 degrees Celsius, and preferably may be between about 300 degrees Celsius and about 500 degrees Celsius, and more preferably may be about 350 degrees Celsius. It may also be desirable to hold the interface between the sorption pads 106 and the target surface at the treatment temperature for a pre-determined treatment time to allow the hydrogen molecules to migrate. The treatment time that may be between about 6 hours or less and about 72 hours, and preferably may be between about 12 and about 60 hours, and more preferably may be between about 24 and about 48 hours.

To achieve the desired treatment temperature at the interface between the sorption pads 106 and the target surface, the apparatus 100 may include a heating apparatus. In the illustrated example, the apparatus 100 has a heating apparatus that includes a plurality of resistive heating coils 168 that are provided on the inner/rear portions of the sorption pads 106 and can be connected to an external power supply 170 via a cable within the umbilical conduit 126. These heating coils 168 can be energized when the apparatus 100 is in use to provide local heating of the pads 106 and the portions of the pressure tube that are in contact with the pads 106.

During the treatment time and while at the treatment temperature, hydrogen may migrate from the pressure tube into the sorption pads 106. Preferably, the treatment time can be selected so that at least about 50% or more of the hydrogen that was present within the pressure tube at the beginning of the treatment process is transferred into the sorption pads 106 at the end of the treatment time.

When the treatment time has been reached, the pads 106 can be retracted, the sealing gaskets 146 released and the apparatus 100 can be withdrawn from the pressure tube.

Radiation Shielding

If the apparatus 100 is used to treat a pressure tube in situ within a reactor, inserting the apparatus into the pressure tube may require removing the existing reactor shield plug from the pressure tube. In some instances, it may be desirable to for the apparatus to include a radiation shield portion that can be used in place of any shield plugs or other shielding members that are removed in order to provide access into the interior of the pressure tube.

In the illustrated example, the apparatus 100 radiation shield portion includes a temporary reactor shield plug 148 that can inhibit the leakage/escape of radiation from with the reactor while the apparatus 100 is in use. The reactor shield plug 148 can be configured to inhibit the gamma radiation, neutron flux and other radiation expected from a given reactor to be treated. In the present example, the reactor shield plug 148 includes a generally cylindrical body portion 150 that substantially fills the cross-sectional area of the pressure tube being treated and has a shield length 152 in the axial direction that is between about 60 cm and about 130 cm.

Optionally, the umbilical conduit, cables, and any coolant channels could be positioned to extend through the reactor shield plug 148 and would preferably take a "torturous path"

through the reactor shield plug 148 such that there is no direct line-of-sight from the exterior into the interior of the reactor.

Preferably, the reactor shield plug 148 is disposed outboard of the sorption pads 106 when the apparatus 100 is in use, and optionally can be configured so that portions of the umbilical conduit 126 and other process or control conduits can extend axially through the reactor shield plug 148. A reactor shield plug 148 may not be needed if the apparatus 100 is used on a pressure tube that does not contain fuel bundles.

Channel Plug

Optionally, when the apparatus 100 is inserted into a pressure tube it may be desirable to seal the outer end of the fuel channel to help contain the coolant within the fuel channel. However, it is also desirable for the umbilical conduit 126 to be able to exit the pressure tube and to communicably link the clamping apparatus to the external controller 128. Therefore, the apparatus 100 may include any suitable sealing or plug member that can seal the end of a pressure tube while still allowing the umbilical conduit 126 to pass through. In the illustrated example, the external portion 104 of the apparatus includes a channel closure plug 170 that can be inserted into the end of the pressure tube to seal the interior of the pressure tube while the apparatus 100 is in use. The plug 170 in this example includes a passage 172 that can accommodate the umbilical conduit 126 and may be sealed using any suitable sealing member (not shown) to prevent unwanted fluid leakage through the passage 172. The plug 170 can preferably remain installed during the duration of the treatment time and can then be removed to allow a user to access and remove the internal portions of the apparatus 100.

Preferably, the apparatus 100, when sealed with a channel plug 170 can be left in the pressure tube for the duration of the treatment time. When the treatment time is complete, the apparatus 100 may be withdrawn from one pressure tube, and preferably can be re-used to treat the interior of another pressure tube.

Method of Use

The discussion below provides one example of how the apparatus 100 may be used to treat a target region of a pressure tube. First, pressure tube/fuel channel can be opened, any existing plugs and shielding can be removed and the internal engagement portion 102 of the apparatus can be inserted into the interior of the pressure tube. This may be done using any suitable mechanism, including using a Universal Delivery Machine (UDM tool) such as that described in "Reactor inspection and maintenance machine senses and homes in on reactor end fittings"; Fell, R. G., & Brown, R; (2003); Proceedings of the 6th CNS international conference on CANDU Maintenance. Preferably, once the internal engagement portion 102 has been inserted the fuel channel can be sealed using the plug 170, which can then allow the UDM or similar tool to be used to service other fuel channels while the apparatus 100 is in use.

Once the internal engagement portion 102 has been inserted, the inner end 108 of the apparatus 100 can be positioned proximate the region to be treated, which in some circumstances may be a rolled joint region where two segments of the fuel channel have been joined together. As the inner end 108 is being inserted the sorption pads 106 and mechanical scraping apparatus 130 can be covered by the sheath 156 for protection.

With the inner end 108 in its desired location, the sealing mechanism can be activated to isolate the treatment region from the surrounding environment. In the illustrated example, this can include inflating the sealing gaskets 146 on the treatment discs 142 to seal against the inner surface of the pressure tube. The annular treatment region bounded axially between the treatment discs 142 can then be drained of coolant or other liquids to provide a desired treatment environment. Preferably, the sorption pads 106 and mechanical scraping apparatus 130 can remain covered during this process.

Once the treatment region has been drained, the moveable portion 160 of the sheath 156 can be retracted to expose the sorption pads 106 and mechanical scraping apparatus 130. The scraping apparatus 130 can then be used to pre-treat the target portion of the fuel channel. When the oxide layer or other contaminants have been removed, the scraping apparatus 130 can be moved away from the target surface and the sorption pads 106, while in their retracted positions, can be moved and registered opposite the target surface.

The clamping apparatus can then be activated to press the sorption pads 106 against the target surface. The interface between the sorption pads 106 and the target surface can then be heated to the treatment temperature using the heating coils 168 and can preferably be maintained at the treatment temperature for a predetermined treatment period. During the treatment period, dissolved hydrogen may migrate from the pressure tube material and may be absorbed within the sorption pads 106.

While the target surface is being treated to remove dissolved hydrogen, coolant may be channeled through the coolant bypass conduit 162 so as to continue flowing through the pressure tube that is being treated. In this example, the coolant bypass conduit 162 extends through the hub 112 and is configured to convey coolant liquid from a source that is on an upstream side of the hub and allow the coolant to be conveyed through the apparatus and to flow into a portion of the pressure tube interior that is downstream from the target surface and sorption pads 106 without contacting the sorption pads 106 with the reactor coolant liquid. Preferably, as illustrated, the coolant bypass conduit 162 can extend axially between the sealing discs 142 so that the coolant liquid will bypass the entire treatment region/volume.

At the conclusion of the treatment period, the sorption pads 106 can be retracted away from the target surface. The treatment region may then be re-filled with the coolant liquid and the sealing apparatus may be disengaged by retracting the sealing members 146. The sheath 156 may be re-extended to cover the sorption pads 106 and mechanical scraping apparatus 130 and the inner end 108 of the apparatus 100 may be withdrawn from the interior of the pressure tube.

The apparatus 100 may then be used to treat another pressure tube. Optionally, a plurality of apparatuses 100 may be used to simultaneously treat a plurality of pressure tubes.

Online Treatment

In the examples described above the treatment of the reactor pressure tubes was done in with the reactor in an offline state. However, reactor outages of this nature are relatively expensive as the utility operating the reactor does not sell power to the grid for the duration of the outage. Thus, there may be an economical benefit to be able to perform at least some degree of hydrogen removal of a pressure tube (such as tube 400) while the reactor remains at high power (i.e. online). To accomplish this, an "online" version of a hydrogen removal process and apparatus could break the hydrogen removal process into two main parts: the first operation may be performed during a reactor outage and can include pre-treating the target surface to a desired extend, such as by removing oxide from the inner surface of the pressure tube. The additional treatment steps could then be performed after the reactor had been returned to its online state.

The apparatus used for such online hydrogen removal may be generally analogous to the apparatus 100 described herein, but may be modified in some aspects to help facilitate the online hydrogen removal. The online hydrogen apparatus would also include suitable sorption pads, including hydrogen getter materials to absorb hydrogen from the pressure tube and would also include a mechanism that ensures sufficient contact between the sorption pads and the pressure tube target surface (such as the clamping mechanisms described herein). Optionally, this mechanism could also utilize the coolant liquid operating pressure and/or mechanical advantage to help ensure contact such that electrical, hydraulic, or pneumatic services for clamping purposes may not be required to maintain the intimate mechanical contact while the reactor operates at high power. A sealing apparatus to define a treatment region chamber, along with suitable seals, and an inert gas supply or vacuum system can be provided to help maintain a dry, sufficiently oxygen-free treatment region adjacent the target surface while the reactor operates at high power. The apparatus may also include a pump or other suitable mechanism for evacuating and drying the treatment region where the sorption pads are deployed. Preferably, the apparatus would also include a suitable flow by-pass channel (like those described herein) such that the fuel channel coolant requirements are maintained under the expected nominal or postulated reactor operating states. In this scenario a section of portable apparatus or the entirety of the apparatus can act in replacement of the usual fuel channel shield plug and may perform all or at least substantially all of the requirements of the shield plug. This may preferably include providing axial support to the fuel bundles in fuel channels where the shield plug is downstream of the fuel bundles.

Preferably, a latching mechanism that is similar or identical to the latching mechanism of the shield plug can be provided as part of the apparatus, or provided with the apparatus, so that a conventional fuelling machine may install or remove the online dehydriding apparatus as desired in the same manner that shield plugs are currently installed or removed. The materials used to form this online dehydriding apparatus can be selected to withstand the expected levels of neutron and gamma irradiation that may be present when the reactor is online.

A suitable channel closure device that is optionally similar or identical to the mechanism of the existing channel closure apparatus could be used, and would preferably include passage and connection for an inert gas or vacuum supply.

Optionally, the online treatment apparatus need not include an independent source of heat, such as the heater described herein. Alternatively, the apparatus may include a heater but it need not be turned on when performing the method online. Instead, hydrogen removal in this method may be performed at the operating temperature of the pressure tube inlet or outlet; wherever the tool is installed. Generally, hydrogen removal under these conditions would occur between approximately 260° C. and 300° C. The online adaptation of the methods and apparatus allows for hydrogen removal of a pressure tube while reducing the economic penalty of lengthening the reactor outage duration unnecessarily.

In such online treatment methods the treatment time may be relatively longer than the treatment time for the offline treatment methods because the operating temperature of the reactor while online may be less than the treatment temperature that is selected for the offline treatment method. The ambient heat of the reactor may be sufficient to have the pressure tube at an acceptable treatment temperature and also to heat the sorption pad that is positioned inside the pressure tube. In some examples this ambient heat may be enough to conduct the desired treatment and there may be no need to actively heat either the pressure tube or sorption pad using a separate heating apparatus. The online treatment process may utilize relatively longer treatment times than the offline treatment process because it is performed at relatively lower pressures, and may have a treatment period that is between about 1 day and about 180 days, and may be between 5 days and about 90 day, and may be between about 10 days and about 60 days.

Features and elements described with reference to one embodiment herein may be used, alone or in combination, with features of other embodiments described herein and other applications of the teachings described herein.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents, and patent applications referred to herein are incorporated by reference in their entirety to the same extent as if each individual publication, patent, or patent application was specifically and individually indicated to be incorporated by reference in its entirety.

We claim:

1. A method of removing hydrogen interstitially dissolved within an object comprising a zirconium alloy and having a first target surface, the method comprising:
    a) positioning a sorption pad having a contact surface and comprising a sorptive material that has a hydrogen-getting capacity so that the contact surface is adjacent the first target surface, the contact surface being configured to be complementary to a shape of the first target surface;
    b) urging the contact surface into metallurgical contact with the first target surface using a clamping apparatus while an interface between the first target surface and the contact surface is at a treatment temperature that is greater than about 200 degrees Celsius;
    c) maintaining the metallurgical contact between the first target surface and the contact surface while the interface is at the treatment temperature for a treatment period, during which the hydrogen migrates from the target object to the sorptive material; and
    d) at the conclusion of the treatment period, separating the contact surface from the first target surface and moving the sorption pad and any hydrogen sequestered therein away from the object.

2. The method of claim 1, wherein prior to step b) the first target surface is at an initial temperature and further comprising the step of heating at least one of the sorptive pad and the target object using a heating apparatus to raise the temperature of the interface between the first target surface and the contact surface from the initial temperature to the treatment temperature.

3. The method of claim 1, wherein in step b) the contact surface is in direct, metallurgical contact with the target surface.

4. The method of claim 1, further comprising pre-treating the target surface prior to step b) to remove at least one of oxides and oxide-forming compounds from the target surface thereby exposing the zirconium alloy to enhance the metallurgical contact between the contact surface and the target surface.

5. The method of claim 4, wherein the pre-treating comprises mechanically scraping the target surface with a scraper shortly prior to step (b).

6. The method of claim 1, further comprising after completing step (d), heating the sorptive material to a regeneration temperature for a regeneration time, whereby the hydrogen that was absorbed within the sorptive material during the treatment period migrates out of the sorptive material, thereby reducing an amount of hydrogen sequestered within the sorptive material.

7. The method of claim 1, wherein when prior to step a) a region of the object that is bounded by the target surface and extends into the object comprises more than about 80 ppm dissolved hydrogen, the method is conducted so that the region of the object comprises less than about 10 ppm hydrogen at the conclusion of step c).

8. The method of claim 1, wherein the sorptive material has a greater thermodynamic affinity for hydrogen than the zirconium alloy in the object and comprises yttrium.

9. The method of claim 1, wherein the contact surface comprises a selective transmission layer that covers the sorptive material and is disposed between the sorptive material and the target surface during the treatment period, the selective transmission layer configured to permit the migration of the hydrogen therethrough and to inhibit the migration of oxygen, whereby oxidation of the sorptive material is inhibited.

10. The method of claim 1, wherein the treatment temperature is greater than 200 degrees Celsius and the treatment period is less than 72 hours.

11. A portable apparatus for removing hydrogen interstitially dissolved within an object comprising a zirconium alloy and having a first target surface during a treatment period, the apparatus comprising:
  a) a sorption pad having a contact surface and comprising a sorptive material that has a hydrogen-getting capacity, the contact surface being positionable opposite the target surface and being configured to be complementary to a shape of the first target surface;
  b) a clamping apparatus that is operable to selectably move the sorption pad between i) a retracted position and in which the contact surface is spaced apart from the target surface and the apparatus is movable relative to the object and ii) a deployed position in which the contact surface is urged into metallurgical contact with the first target surface and movement of the apparatus relative to the object is inhibited; and
  c) a controller configured to control the clamping apparatus wherein when a first treatment period is initiated the contact surface is moved to and maintained in the deployed position whereby the hydrogen migrates from the target object to the sorptive material during the treatment period, and wherein when the first treatment period is complete the contact surface is moved to the retracted position.

12. The apparatus of claim 11, further comprising a heater that is configured to heat an interface between the contact surface and the target surface to a treatment temperature that is greater than about 200 degrees Celsius during the treatment period.

13. The apparatus of claim 11, wherein the sorptive material comprises yttrium.

14. The apparatus of claim 11, wherein the contact surface comprises a selective transmission layer that covers the sorptive material and is configured so that the selective transmission layer is disposed between the sorptive material and the target surface when the sorption pad is in the deployed position, the selective transmission layer being formed from a different material than the sorption pad and configured to permit the migration of the hydrogen therethrough and to inhibit the migration of oxygen, whereby oxidation of the sorptive material during the treatment period is inhibited.

15. The apparatus of claim 11, further comprising a sealing apparatus that is adjacent the sorption pad and is configurable in i) a transport configuration in which the sealing apparatus is positionable proximate the target surface and ii) a deployed configuration in which the sealing apparatus seals with the object to fluidly isolate a treatment region containing the target surface and the contact surface from the ambient environment, wherein the sealing apparatus is maintainable in the deployed configuration during the treatment period and being returnable to the transport configuration at the conclusion of the treatment period.

16. A portable apparatus for removing hydrogen that is interstitially dissolved within a pressure tube for a pressure tube nuclear reactor during a treatment period, the pressure tube comprising a zirconium alloy, the apparatus comprising:
  a) an internal engagement portion that is insertable within an interior of the pressure tube and comprising:
    i) a hub extending along a hub axis, the hub axis being aligned with an axial direction of the pressure tube when the hub is within the pressure tube;
    ii) at least a first sorption pad supported by the hub and having a first contact surface and comprising a sorptive material that has a hydrogen-getting capacity, the first contact surface being positionable opposite a first target surface on the interior of the pressure tube and having a curved shape that is complementary to a curvature of the first target surface; and
    iii) a clamping apparatus that is operable to selectably move the first sorption pad between i) a retracted position in which the first contact surface is spaced apart from the first target surface and the internal engagement portion is movable relative to the pressure tube to move the first contact surface into registration with the first target surface and ii) a deployed position in which the first contact surface is urged radially outwardly and into metallurgical contact with the first target surface, and
  wherein when a first treatment period is initiated the first contact surface is moved to and maintained in the deployed position whereby the hydrogen migrates from the target object pressure tube to the sorptive material during the first treatment period, and wherein when the first treatment period is complete the first contact surface is moved to the retracted position and the internal engagement portion is removable from the interior of the pressure tube.

17. The apparatus of claim 16, further comprising an external portion positionable outside the pressure tube and comprising a controller that is communicably linked to the internal engagement portion and configured to control the clamping apparatus.

18. The apparatus of claim 17, wherein the internal engagement portion further comprises a heater that is configured to heat an interface between the first target surface and the first contact surface to a treatment temperature that is greater than about 200 degrees Celsius for a treatment period whereby the hydrogen migrates from the pressure tube to the sorptive material.

19. The apparatus of claim 17, further comprising an umbilical conduit extending between the external portion and the internal engagement portion, the umbilical conduit containing at least one of a hydraulic fluid conduit, a pneumatic fluid conduit and an electrical cable.

20. The apparatus of claim 16, further comprising a coolant bypass conduit that extends axially through the hub between first and second conduit ends that are disposed on opposite sides of a treatment region, the coolant bypass conduit being operable to convey a reactor coolant liquid from one side of the treatment region to another side of the treatment region without exposing an interior of the treatment region to the reactor coolant liquid.

* * * * *

UNITED STATES PATENT AND TRADEMARK OFFICE
CERTIFICATE OF CORRECTION

PATENT NO. : 12,077,836 B2
APPLICATION NO. : 17/612784
DATED : September 3, 2024
INVENTOR(S) : Sean Hanlon et al.

Page 1 of 1

It is certified that error appears in the above-identified patent and that said Letters Patent is hereby corrected as shown below:

In the Claims

<u>At Column 32</u>
In Claim 16, Line 57, delete "target object".

Signed and Sealed this
Fifteenth Day of October, 2024

Katherine Kelly Vidal
*Director of the United States Patent and Trademark Office*